US008698710B2

(12) United States Patent
Ono

(10) Patent No.: US 8,698,710 B2
(45) Date of Patent: Apr. 15, 2014

(54) DISPLAY DEVICE AND METHOD OF DRIVING THE SAME

(75) Inventor: Shinya Ono, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/422,124

(22) Filed: Mar. 16, 2012

(65) Prior Publication Data

US 2012/0176422 A1 Jul. 12, 2012

Related U.S. Application Data

(63) Continuation of application No. PCT/JP2010/005457, filed on Sep. 6, 2010.

(51) Int. Cl.

| | |
|---|---|
| ***G06F 3/038*** | (2013.01) |
| ***G09G 5/00*** | (2006.01) |
| ***G09G 3/30*** | (2006.01) |

(52) U.S. Cl.
USPC ............................................ 345/76; 345/77

(58) Field of Classification Search
USPC .................... 345/76-83, 204-215, 690-699; 315/169.1-169.4
See application file for complete search history.

(56) References Cited

U.S. PATENT DOCUMENTS

| | | | | |
|---|---|---|---|---|
| 7,397,447 | B2 * | 7/2008 | Matsumoto | 345/76 |
| 7,492,336 | B2 * | 2/2009 | Kim | 345/76 |
| 7,898,509 | B2 | 3/2011 | Iida et al. | |
| 8,054,298 | B2 | 11/2011 | Asano et al. | |
| 2004/0233141 | A1 * | 11/2004 | Matsumoto | 345/76 |
| 2004/0239596 | A1 * | 12/2004 | Ono et al. | 345/76 |
| 2005/0168491 | A1 * | 8/2005 | Takahara et al. | 345/690 |
| 2005/0219166 | A1 * | 10/2005 | Kim | 345/76 |
| 2005/0280616 | A1 * | 12/2005 | Miwa et al. | 345/77 |
| 2006/0119552 | A1 * | 6/2006 | Yumoto | 345/76 |
| 2006/0187153 | A1 * | 8/2006 | Nathan et al. | 345/76 |
| 2006/0221015 | A1 * | 10/2006 | Shirasaki et al. | 345/77 |
| 2008/0043005 | A1 * | 2/2008 | Kanda | 345/204 |
| 2008/0158110 | A1 | 7/2008 | Iida et al. | |
| 2008/0291125 | A1 | 11/2008 | Yamashita et al. | |
| 2009/0122047 | A1 | 5/2009 | Yamamoto et al. | |
| 2009/0167647 | A1 | 7/2009 | Yamamoto et al. | |
| 2009/0189924 | A1 * | 7/2009 | Ogura | 345/690 |
| 2009/0225009 | A1 * | 9/2009 | Ka | 345/76 |
| 2009/0244050 | A1 * | 10/2009 | Yamamoto et al. | 345/212 |
| 2009/0244055 | A1 | 10/2009 | Asano et al. | |
| 2011/0181192 | A1 | 7/2011 | Ono | |

FOREIGN PATENT DOCUMENTS

| | | |
|---|---|---|
| JP | 2003-186439 | 7/2003 |
| JP | 2003-195809 | 7/2003 |
| JP | 2008-122633 | 5/2008 |
| JP | 2008-164796 | 7/2008 |

(Continued)

*Primary Examiner* — Amr Awad
*Assistant Examiner* — Roberto Flores
(74) *Attorney, Agent, or Firm* — Greenblum & Bernstein, P.L.C.

(57) ABSTRACT

The display device including pixels has formed therein at least two drive blocks each made up of pixel rows. Each of the pixels includes: a drive transistor; a capacitor element, a luminescence element; and a first switching transistor which causes conduction between the source of the drive transistor and a fixed potential line. Each of the pixels further includes a second switching transistor which connects a pixel in a k-th drive block and a first signal line or a third switching transistor which connects a pixel in a (k+1)-th drive block and a second signal line. A first control line for controlling conduction of the first switching element is connected to each of the pixels in a same one of the drive blocks.

7 Claims, 11 Drawing Sheets

(56) References Cited

FOREIGN PATENT DOCUMENTS

| | | |
|---|---|---|
| JP | 2008-287139 | 11/2008 |
| JP | 2009-139928 | 6/2009 |
| JP | 2009-157019 | 7/2009 |
| JP | 2009-216869 | 9/2009 |
| JP | 2009-237041 | 10/2009 |
| JP | 2010-054564 | 3/2010 |
| WO | 2010/100938 | 9/2010 |

* cited by examiner

Pixel in odd block

Pixel in even block

DISPLAY DEVICE AND METHOD OF DRIVING THE SAME

CROSS REFERENCE TO RELATED APPLICATION

This is a continuation application of PCT Patent Application No. PCT/JP2010/005457 filed on Sep. 6, 2010, designating the United States of America. The entire disclosure of the above-identified application, including the specification, drawings and claims is incorporated herein by reference in its entirety.

BACKGROUND OF THE INVENTION (1) Field of the Invention

The present invention relates to display devices and methods of driving the same, and particularly to a display device using current-driven luminescence elements, and a method of driving the same.

(2) Description of the Related Art

Display devices using organic electroluminescence (EL) elements are well-known as display devices using current-driven luminescence elements. An organic EL display device using such self-luminous organic EL elements does not require backlights needed in a liquid crystal display device and is best suited for increasing device thinness. Furthermore, since viewing angle is not restricted, practical application as a next-generation display device is expected. Furthermore, the organic EL elements used in the organic EL display device are different from liquid crystal cells which are controlled according to the voltage applied thereto, in that the luminance of the respective luminescence elements is controlled according to the value of the current flowing thereto.

In the organic EL display device, the organic EL elements included in the pixels are normally arranged in rows and columns. In an organic EL display referred to as a passive-matrix organic EL display, an organic EL element is provided at each crosspoint between row electrodes (scanning lines) and column electrodes (data lines), and such organic EL elements are driven by applying a voltage equivalent to a data signal, between a selected row electrode and the column electrodes.

On the other hand, in an organic EL display device referred to as an active-matrix organic EL display device, a switching thin film transistor (TFT) is provided in each crosspoint between scanning lines and data lines, the gate of a drive element is connected to the switching TFT, the switching TFT is turned ON through a selected scanning line so as to input a data signal from a signal line to the drive element, and an organic EL element is driven by such drive element.

Unlike in the passive-matrix organic EL display device where, only during the period in which each of the row electrodes (scanning lines) is selected, does the organic EL element connected to the selected row electrode generate photons, in the active-matrix organic EL display device, it is possible to cause the organic EL element to generate photons until a subsequent scan (selection), and thus a reduction in display luminance is not incurred even when the duty ratio increases. Therefore, the active-matrix organic EL display device can be driven with low voltage and thus allows for reduced power consumption. However, in the active-matrix organic EL display device, due to variation in the characteristics of the drive transistors, the luminance of the organic EL elements are different among the respective pixels even when the same data signal is supplied, and thus there is the disadvantage of the occurrence of luminance unevenness.

In response to this problem, for example, Japanese Unexamined Patent Application Publication No. 2008-122633 (Patent Reference 1) discloses a method of compensating for the variation of characteristics for each pixel using a simple pixel circuit, as a method of compensating for the luminance unevenness caused by the variation in the characteristics of the drive transistors.

FIG. 9 is a block diagram showing the configuration of a conventional image display device disclosed in Patent Reference 1. An image display device 500 shown in the figure includes a pixel array unit 502 and a drive unit which drives the pixel array unit 502. The pixel array unit 502 includes scanning lines 701 to 70*m* disposed on a row basis, and signal lines 601 to 60*n* disposed on a column basis, pixels 501 each of which is disposed on a part at which both a scanning line and a signal line cross, and power supply lines 801 to 80*m* disposed on a row basis. Furthermore, the drive unit includes a signal selector 503, a scanning line drive unit 504, and a power supply line drive unit 505.

The scanning line drive unit 504 performs line-sequential scanning of the pixels 501 on a per row basis, by sequentially supplying control signals on a horizontal cycle (1 H) to each of the scanning lines 701 to 70*m*. The power supply line drive unit 505 supplies, to each of the power supply lines 801 to 80*m*, power source voltage that switches between a first voltage and a second voltage, in accordance with the line-sequential scanning. The signal selector 503 supplies, to the signal lines 601 to 60*n* that are in columns, a reference voltage and a luminance signal voltage which serves as an image signal, switching between the two voltages in accordance with the line-sequential scanning.

Here, two each of the respective signal lines 601 to 60*n* in columns are disposed per column; one of the signal lines supplies the reference voltage and the signal voltage to the pixels 501 in an odd row, and the other of the signal lines supplies the reference voltage and the signal voltage to the pixels 501 in an even row.

FIG. 10 is a circuit configuration diagram for a pixel included in the conventional image display device disclosed in Patent Reference 1. It should be noted that the figure shows the pixel 501 in the first row and the first column. The scanning line 701, the power supply line 801, and the signal lines 601 are provided to this pixel 501. It should be noted that one out of the two lines of the signal lines 601 is connected to this pixel 501. The pixel 501 includes a switching transistor 511, a drive transistor 512, a storing capacitor 513, and a luminescence element 514. The switching transistor 511 has a gate connected to the scanning line 701, one of a source and a drain connected to the signal line 601, and the other connected to the gate of the drive transistor 512. The drive transistor 512 has a source connected to the anode of the luminescence element 514 and a drain connected to the power supply line 801. The luminescence element 514 has a cathode connected to a grounding line 515. The storing capacitor 513 is connected to the source and gate of the drive transistor 512.

In the above-described configuration, the power supply line drive unit 505 switches the voltage of the power supply line 801, from a first voltage (high-voltage) to a second voltage (low-voltage), when the voltage of the signal line 601 is the reference voltage. Likewise, when the voltage of the signal line 601 is the reference voltage, the scanning line drive unit 504 sets the voltage of the scanning line 701 to an “H” level and causes the switching transistor 511 to be in a conductive state so as to apply the reference voltage to the gate of the drive transistor 512 and set the source of the drive transistor 512 to the second voltage. With the above-described operation, preparation for the correction of a threshold voltage Vt(TFT) of the drive transistor 512 is completed.

Next, in the correction period before the voltage of the signal line 601 switches from the reference voltage to the signal voltage, the power supply line drive unit 505 switches the voltage of the power supply line 801, from the second voltage to the first voltage, and causes a voltage equivalent to the threshold voltage Vt(TFT) of the drive transistor 512 to be stored in the storing capacitor 513.

Next, the power supply line drive unit 505 sets the voltage of the switching transistor 511 to the "H" level and causes the signal voltage to be held in the storing capacitor 513. Specifically, the signal voltage is added to the previously held voltage equivalent to the threshold voltage Vt(TFT) of the drive transistor 512, and stored into the storing capacitor 513. Then, the drive transistor 512 receives a supply of current from the power supply line 801 to which the first voltage is being applied, and supplies the luminescence element 514 with a drive current corresponding to the held voltage.

In the above-described operation, the period of time during which the reference voltage is applied to the respective signal lines is prolonged through the placement of two of the signal lines 601 in every column. This secures the correction period for storing the voltage equivalent to the threshold voltage Vt(TFT) of the drive transistor 512 in the storing capacitor 513.

FIG. 11 is an operation timing chart for the image display device disclosed in Patent Reference 1. The figure describes, sequentially from the top, the signal waveforms of: the scanning line 701 and the power supply line 801 of the first line; the scanning line 702 and the power supply line 802 of the second line; the scanning line 703 and the power supply line 803 of the third line; the signal line allocated to the pixel of an odd row; and the signal line allocated to the pixel of an even row. The scanning signal applied to the scanning lines sequentially shifts 1 line for every 1 horizontal period (1 H). The scanning signal applied to the scanning lines for one line includes two pulses. The time width of the first pulse is long at 1 H or more. The time width of the second pulse is narrow and is part of 1 H. The first pulse corresponds to the above-described threshold voltage correction period, and the second pulse corresponds to a signal voltage sampling period and a mobility correction period. Furthermore, the power source pulse supplied to the power supply lines also shifts 1 line for every 1 H cycle. In contrast, the signal voltage is applied once every 2 H to the respective signal lines, and thus it is possible to ensure that the period of time during which the reference voltage is applied is 1 H or more.

In this manner, in the conventional image display device disclosed in Patent Reference 1, even when there is a variation in the threshold voltage Vt(TFT) of the drive transistor 512 for each pixel, by ensuring a sufficient threshold voltage correction period, the variation is canceled on a pixel basis, and unevenness in the luminance of an image is inhibited.

SUMMARY OF THE INVENTION

However, in the conventional image display device disclosed in Patent Reference 1, there is frequent turning ON and OFF of the signal level of the scanning lines and power supply lines provided to each of the pixel rows. For example, the threshold voltage correction period needs to be set for each of the pixel rows. Furthermore, when sampling luminance signal voltage from a signal line via a switching transistor, luminescence production (photon generation) periods need to be provided successively. Therefore, the threshold voltage correction timing and luminescence production timing for each pixel row needs to be set. As such, since the number of rows increases with an increase in the area of a display panel, the signals outputted from each drive circuit increases and the frequency for the signal switching thereof rises, and the signal output load of the scanning line drive circuit and the power supply line drive circuit increases.

Furthermore, in the conventional image display device disclosed in Patent Reference 1, the correction period for the threshold voltage Vt(TFT) of the drive transistor is under 2 H, and thus there is a limitation for a display device in which high-precision correction is required.

In view of the aforementioned problem, the present invention has as an object to provide a display device having reduced drive circuit output load and improved display quality due to high-precision threshold voltage correction.

In order to achieve the aforementioned object, the display device according to an aspect of the present invention is a display device including pixels arranged in rows and columns, the display device including: a first signal line and a second signal line that are disposed in each of the columns, for supplying the pixels in the corresponding column with a signal voltage that determines luminance of the pixels; a first power source line and a second power source line; a scanning line disposed in each of the rows; and a control line disposed in each of the rows, wherein the pixels compose at least two drive blocks each of which includes at least two of the rows, each of the pixels includes: a luminescence element that includes terminals, one of the terminals being connected to the second power source line, and the luminescence element generating photons according to a flow of a signal current corresponding to the signal voltage; a drive transistor that includes a gate, a source, and a drain, one of the source and the drain being connected to the first power source line, the other of the source and the drain being connected to the other of the terminals of the luminescence element, and the drive transistor converting the signal voltage applied between the gate and the source of the drive transistor into the signal current; a capacitor element that includes terminals, one of the terminals being connected to the gate of the drive transistor, and the other of the terminals being connected to the source of the drive transistor; and a first switching transistor that includes a gate connected to the control line, one of a source and a drain connected to the other of the terminals of the capacitor element, and the other of the source and the drain connected to a fixed potential line, each of the pixels in a k-th drive block of the drive blocks further includes a second switching transistor that includes a gate connected to the scanning line, one of a source and a drain connected to the gate of the drive transistor, and the other of the source and the drain connected to the first signal line, k being a positive integer, each of the pixels in a (k+1)-th drive block of the drive blocks further includes a third switching transistor that includes a gate connected to the scanning line, one of a source and a drain connected to the gate of the drive transistor, and the other of the source and the drain connected to the second signal line, and the control line is connected to the pixels in a same one of the drive blocks and not connected to the pixels in different ones of the drive blocks.

According to the display device and the method of driving the same according to the present invention, the drive transistor threshold voltage correction periods as well as the timings thereof can be made uniform within a drive block, and thus the number of times that the signal level is switched from ON to OFF and from OFF to ON can be reduced and thus reducing the load on the drive circuit which drives the respective circuits of the pixels. In addition, through the above-described forming of drive blocks and the two signal lines provided for each pixel column, the drive transistor threshold voltage correction period can take a large part of a 1-frame period, and thus a highly precise drive current flows to the luminescence elements and image display quality improves.

BRIEF DESCRIPTION OF THE DRAWINGS

These and other objects, advantages and features of the invention will become apparent from the following description thereof taken in conjunction with the accompanying drawings that illustrate a specific embodiment of the present invention. In the Drawings:

FIG. 2 B is a specific circuit configuration diagram of a pixel of an even drive block in the display device according to the embodiment of the present invention;

DESCRIPTION OF THE PREFERRED EMBODIMENT

Figure 1:
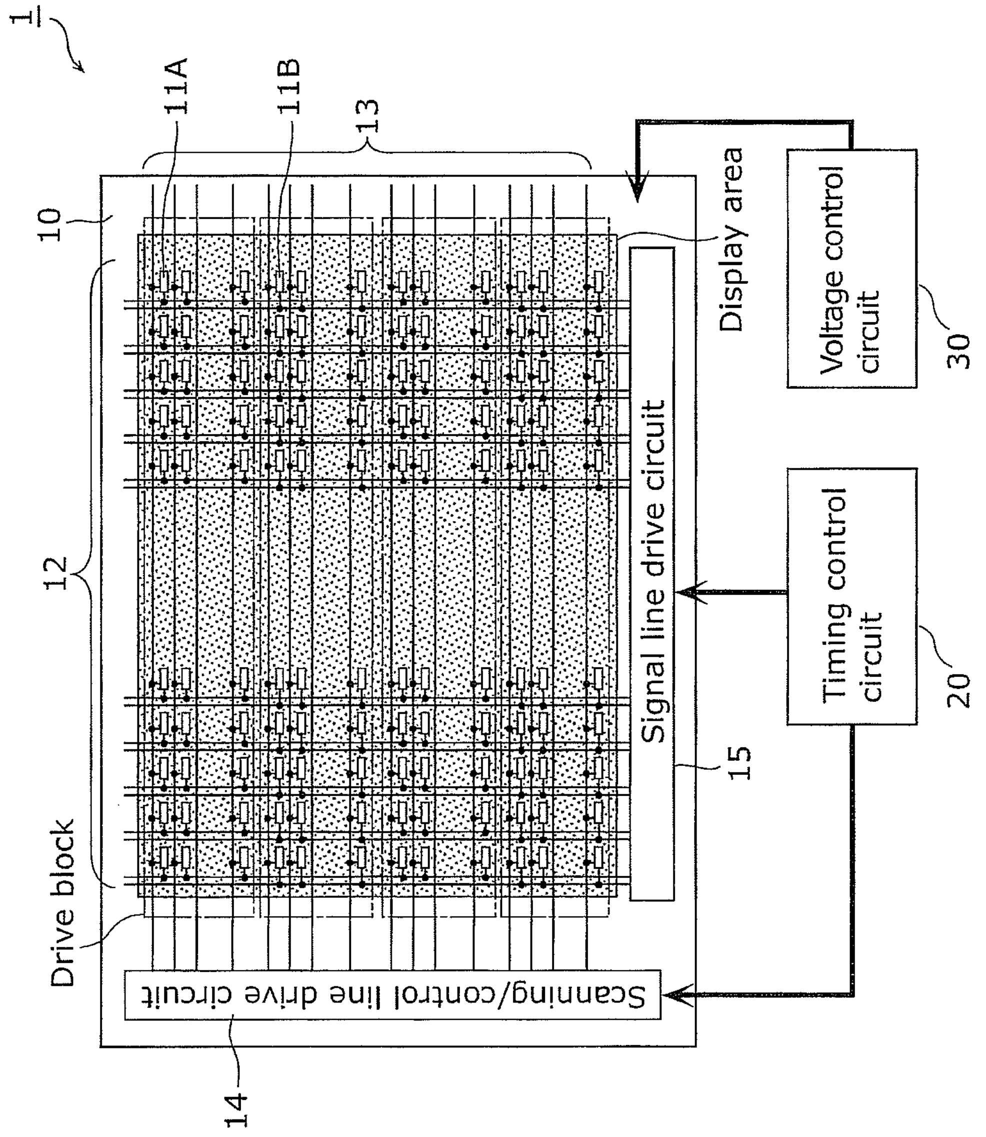
FIG. 1 is a block diagram showing the electrical configuration of a display device according to an embodiment of the present invention.

In order to achieve the aforementioned object, the display device according to an aspect of the present invention is a display device including pixels arranged in rows and columns, the display device including: a first signal line and a second signal line that are disposed in each of the columns, for supplying the pixels in the corresponding column with a signal voltage that determines luminance of the pixels; a first power source line and a second power source line; a scanning line disposed in each of the rows; and a control line disposed in each of the rows, wherein the pixels compose at least two drive blocks each of which includes at least two of the rows, each of the pixels includes: a luminescence element that includes terminals, one of the terminals being connected to the second power source line, and the luminescence element generating photons according to a flow of a signal current corresponding to the signal voltage; a drive transistor that includes a gate, a source, and a drain, one of the source and the drain being connected to the first power source line, the other of the source and the drain being connected to the other of the terminals of the luminescence element, and the drive transistor converting the signal voltage applied between the gate and the source of the drive transistor into the signal current; a capacitor element that includes terminals, one of the terminals being connected to the gate of the drive transistor, and the other of the terminals being connected to the source of the drive transistor; and a first switching transistor that includes a gate connected to the control line, one of a source and a drain connected to the other of the terminals of the capacitor element, and the other of the source and the drain connected to a fixed potential line, each of the pixels in a k-th drive block of the drive blocks further includes a second switching transistor that includes a gate connected to the scanning line, one of a source and a drain connected to the gate of the drive transistor, and the other of the source and the drain connected to the first signal line, k being a positive integer, each of the pixels in a (k+1)-th drive block of the drive blocks further includes a third switching transistor that includes a gate connected to the scanning line, one of a source and a drain connected to the gate of the drive transistor, and the other of the source and the drain connected to the second signal line, and the control line is connected to the pixels in a same one of the drive blocks and not connected to the pixels in different ones of the drive blocks.

According to this aspect, the drive transistor threshold voltage correction period and the timing thereof can be made uniform within the same drive block by way of (i) a pixel circuit provided with: the first switching transistor which connects the source of the drive transistor and the fixed potential line; and the capacitor element for storing voltages corresponding to the threshold voltage of the drive transistor and the luminance signal voltage, and (ii) the arrangement of control lines, scanning lines, and signal lines to the respective pixels which are grouped into drive blocks. Therefore, the load on the drive circuit which outputs signals for controlling current paths, and controls signal voltages is reduced. In addition, through the above-described forming of drive blocks and the two signal lines arranged for every pixel column, the drive transistor threshold voltage correction period can take a large part of a 1 frame period Tf which is the time in which all the pixels are refreshed. This is because the threshold voltage correction period is provided in the (k+1)-th drive block in the period in which the luminance signal is sampled in the k-th drive block. Therefore, the threshold voltage correction period is not divided on a per pixel row basis, but is divided on a per drive block basis. Therefore, as the display area is increased, a long relative threshold voltage correction period can be set with respect to 1 frame period, without allowing luminescence duty to decrease with the increase in the display area. With this, a drive current based on luminance signal voltage that has been corrected with a high degree of precision flows to the luminescence elements, and thus image display quality improves.

Furthermore, in the display device according to an aspect of the present invention, each of the pixels may further include a second capacitor element inserted between the source of the drive transistor and the fixed potential line.

According to this aspect, the second capacitor element stores the source potential of the drive transistor in the steady state. It should be noted that the source potential in the steady state is the threshold voltage of the drive transistor. Even when the signal voltage is applied to the first electrode of a capacitor element, the source potential thereof remains in the node between such capacitor element and the second capacitor element. Therefore, with the application of the aforementioned signal voltage, a voltage corresponding to the voltage difference between the signal voltage of the first signal line or the second signal line and the reference voltage is applied to the capacitor element.

Furthermore, an image display device according to an aspect of the present invention further includes a drive circuit which drives each of the pixels by controlling the first signal line, the second signal line, the control line, and the scanning line, wherein the drive circuit: simultaneously applies a reference voltage from the first signal line to the gate of the drive transistor of each of the pixels in the k-th drive block by simultaneously applying a voltage, from the scanning line, which turns ON the second switching transistor of each of the pixels in the k-th drive block; simultaneously applies a fixed voltage from the fixed potential line to the source of the drive transistor of each of the pixels in the k-th drive block by simultaneously applying a voltage, from the control line, which turns ON the first switching transistor of each of the pixels in the k-th drive block, the fixed voltage being lower than the reference voltage by at least a threshold voltage of the drive transistor; simultaneously causes non-conduction between the first signal line and the gate of the drive transistor of each of the pixels in the k-th drive block by simultaneously applying a voltage, from the scanning line, which turns OFF the second switching transistor of each of the pixels in the k-th drive block; simultaneously applies the reference voltage from the second signal line to the gate of the drive transistor of each of the pixels in the (k+1)-th drive block by simultaneously applying a voltage, from the scanning line, which turns ON the third switching transistor of each of the pixels in the (k+1)-th drive block; simultaneously applies the fixed voltage to the source of the drive transistor of each of the pixels in the (k+1)-th drive block by simultaneously applying the voltage, from the control line, which turns ON the first switching transistor of each of the pixels in the (k+1)-th drive block; and simultaneously causes non-conduction between the second signal line and the gate of the drive transistor of each of the pixels in the (k+1)-th drive block by simultaneously applying the voltage, from the scanning line, which turns OFF the third switching transistor of each of the pixels in the (k+1)-th drive block.

According to this aspect, the drive circuit which controls the voltage of the first signal line, the second signal line, the control line, and the scanning line, controls the threshold voltage correction period, the signal voltage storing period, and the luminescence production (photon generation) period.

Furthermore, in an image display device according to an aspect of the present invention, the signal voltage includes a luminance signal voltage for causing the luminescence element to generate photons and a reference voltage for causing a voltage corresponding to a threshold voltage of the drive transistor to be stored in the capacitor element, the display device further includes: a signal line drive circuit that outputs the signal voltage to the first signal line and the second signal line; and a timing control circuit that controls the timing at which the signal line drive circuit outputs the signal voltage, and the timing control circuit (i) causes the signal line drive circuit to output the reference voltage to the second signal line when the signal line drive circuit is outputting the luminance signal voltage to the first signal line, and (ii) causes the signal line drive circuit to output the reference voltage to the first signal line when the signal line drive circuit is outputting the luminance signal voltage to the second signal line.

According to the present aspect, the threshold voltage correction period is provided in the (k+1)-th drive block, in the period in which the luminance signal is sampled in the k-th drive block. Therefore, the threshold voltage correction period is not divided on a per pixel row basis, but is divided on a per drive block basis. Therefore, a longer relative threshold voltage correction period can be set as the display area is increased.

Furthermore, in a display device according to an aspect of the present invention, where a period of time for refreshing all of the pixels is Tf, and a total number of the drive blocks is N, a period of time for detecting the threshold voltage of the drive transistors is at most Tf/N.

Furthermore, the present invention can be implemented, not only as a display device including such characteristic units, but also as display device driving method having the characteristic units included in the display device as steps.

(Embodiment)

A display device according to the present embodiment is a display device including pixels arranged in rows and columns, the display device including: a first signal line and a second signal line that are disposed in each of the columns; and a control line disposed in each of the rows, wherein the pixels compose at least two drive blocks each of which includes at least two of the rows, each of the pixels includes: a drive transistor; a capacitor element having terminals connected respectively to the gate and the source of the drive transistor; a luminescence element connected to the source of the drive transistor; a first switching transistor inserted between the source of the drive transistor and a fixed potential line, and including a gate connected to the control line; and a second capacitor element inserted between the source of the drive transistor and the fixed potential line, each of the pixels in an odd drive block further includes a second switching transistor inserted between the first signal line and the gate of the drive transistor, each of the pixels in an even drive block further includes a third switching transistor inserted between the second signal line and the gate of the drive transistor, and the control line is connected to the pixels in a same one of the drive blocks. With this, the drive transistor threshold voltage correction periods can be made uniform within the drive block. Therefore, the number of control lines to which the drive circuit outputs is reduced, and thus the circuit size of the drive circuit can be made smaller. Furthermore, since a long threshold voltage correction period can be taken with respect to one frame period, image display quality is improved.

Hereinafter, an embodiment of the present invention shall be described with reference to the Drawings.

FIG. 1 is a block diagram showing the electrical configuration of a display device according to an embodiment of the present invention. A display device 1 in the figure includes a display panel 10, a timing control circuit 20, and a voltage control circuit 30. The display panel 10 includes plural pixels 11A and 11B, a signal line group 12, a control line group 13, a scanning/control line drive circuit 14, and a signal line drive circuit 15.

The pixels 11A and 11B are arranged in rows and columns on the display panel 10. Here, the pixels 11A and 11B compose two or more drive blocks each of which is one drive block made up of plural pixel rows. The pixels 11A compose a k-th drive block (k is a positive integer) and the pixels 11B compose a (k+1)-th drive block. However, in the case where the display panel 10 is divided into N drive blocks, (k+1) is a positive integer less than or equal to N. This means that, for example, the pixels 11A compose odd drive blocks and the pixels 11B compose even drive blocks.

The signal line group 12 includes plural signal lines disposed in each of the pixel columns. Here, two signal lines are disposed in each of the pixel columns, the pixels of odd drive blocks are connected to a first signal line, and the pixels of even drive blocks are connected to a second signal line different from the first signal line.

The control line group 13 includes scanning lines and control lines, with each of the scanning lines and each of the control lines disposed on a per pixel basis.

The scanning/control line drive circuit 14 drives the circuit element of each pixel by outputting a scanning signal to the respective scanning lines of the control line group 13 and outputting a control signal to the respective control lines of the control line group 13.

The signal line drive circuit 15 drives the circuit element of each pixel by outputting a luminance signal or a reference signal to the respective signal lines of the signal line group 12.

The timing control circuit 20 controls the output timing of scanning signals and control signals outputted from the scanning/control line drive circuit 14. Furthermore, the timing control circuit 20 controls the timing for the outputting of luminance signals or reference signals outputted to the first signal line and the second signal line from the signal line drive circuit 15. The timing control circuit 20 causes the signal line drive circuit to output the reference voltage to the second signal line while causing the outputting of the luminance signal to the first signal line, and causes the signal line drive circuit to output the reference voltage to the first signal line while causing the outputting of the luminance signal to the second signal line.

The voltage control circuit 30 controls the voltage level of the scanning signals and the control signals outputted from the scanning/control line drive circuit 14.

Figure 2A:
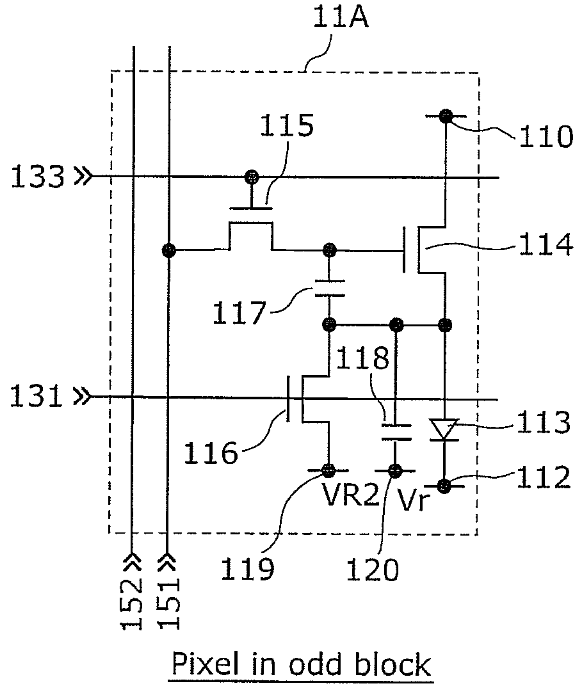
FIG. 2 A is a specific circuit configuration diagram of a pixel of an odd drive block in the display device according to the embodiment of the present invention.
Figure 2B:
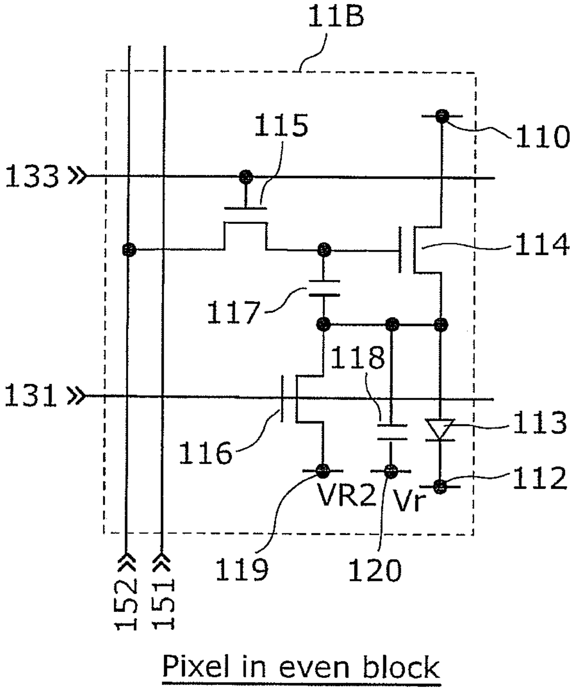

FIG. 2A is a specific circuit configuration diagram of a pixel of an odd drive block in a display device according to the embodiment of the present invention, and FIG. 2B is a specific circuit configuration diagram of a pixel of an even drive block in a display device according to the embodiment of the present invention. Each of the pixels 11A and 11B shown in FIG. 2A and FIG. 2B, respectively, include: an organic electroluminescence (EL) element 113; a drive transistor 114; switching transistors 115 and 116; electrostatic storing capacitors 117 and 118; a control line 131; a scanning line 133; a first signal line 151; and a second signal line 152.

In FIG. 2A and FIG. 2B, the organic EL element 113 is a luminescence element having a cathode connected to the power source line 112, which is a second power source line, and an anode connected to the source of the drive transistor 114. The organic EL element 113 generates photons according to the flow of the drive current of the drive transistor 114.

The drive transistor 114 is a drive transistor having a drain connected to the power source line 110 which is a first power source line, and a source connected to the anode of the organic EL element 113. The drive transistor 114 converts a signal voltage applied between the gate and source into a drain current corresponding to such signal voltage. Subsequently, the drive transistor 114 supplies this drain current, as a drive current, to the organic EL element 113. The drive transistor 114 is configured of, for example, an n-type thin film transistor (n-type TFT).

The switching transistor 115 has a gate connected to the scanning line 133, and one of a source and a drain connected to the gate of the drive transistor 114. Furthermore, the other of the source and the drain is connected to the first signal line 151 and functions as a second switching transistor in the pixel 11A in the odd drive block; and is connected to the second signal line 152 and functions as a third switching transistor in the pixel 11B in the even drive block.

The switching transistor 116 is a first switching transistor having a gate connected to the control line 131, one of a source and a drain connected to the source of the drive transistor 114, and the other of the source and the drain connected to a fixed potential line 119. The switching transistor 116 has a function of determining the timing for applying the fixed voltage VR2 to the source of the drive transistor 114. The drive transistors 115 and 116 are each configured of, for example, an n-type thin film transistor (n-type TFT).

The electrostatic storing capacitor 117 is a capacitor element having a first electrode, which is one of its terminals, connected to the gate of the drive transistor 114 and a second electrode, which is the other of the terminals, connected to the source of the drive transistor 114. The electrostatic storing capacitor 117 has a function of storing a voltage corresponding to the luminance signal voltage supplied from the first signal line 151 or the second signal line 152 and to the threshold voltage of the drive transistor 114, and controlling a signal current supplied from the drive transistor 114 to the organic EL element 113 after the switching transistor 115 is turned OFF for example.

The electrostatic storing capacitor 118 is a second capacitor element inserted between the source of the drive transistor 114 and a fixed potential line 120. The electrostatic storing capacitor 118 first stores the source potential of the drive transistor 114 in the steady state. It should be noted that the source potential in the steady state is the threshold voltage of the drive transistor 114. Even when the luminance signal voltage is applied to the first electrode of the electrostatic storing capacitor 117 via the switching transistor 115, the information of the source potential of the drive transistor 114 remains in the node between the electrostatic storing capacitor 117 and the electrostatic storing capacitor 118. Therefore, with the application of the aforementioned luminance signal voltage, a voltage corresponding to the voltage difference between the luminance signal voltage of the first signal line 151 or the second signal line 152 and the reference voltage is applied to the electrostatic storing capacitor 117.

It should be noted that it is sufficient that the other terminal of the electrostatic storing capacitor 118 be terminated at an arbitrary fixed potential, or such other terminal may be connected to the fixed potential line 119. Furthermore, for example, the other terminal may be connected to the power source line 110 or 112. In this case, layout flexibility is improved, a wider space can be secured between elements, and yield is improved.

Furthermore, the electrostatic storing capacitor 118 need not be an artificially arranged circuit element as described above, and, for example, the parasitic capacitance of the organic EL element 113 may be made to serve as the electrostatic storing capacitor 118.

The control line 131 is connected to the scanning/control line drive circuit 14, and is connected to the respective pixels belonging to the pixel row including the pixels 11A or 11B. With this, the control line 131 has a function of selecting a conductive or non-conductive state between the source of the drive transistor 114 and the fixed potential line 119.

The scanning line 133 has a function of supplying the respective pixels belonging to the pixel row including the pixels 11A or 11B with the timing for storing a signal voltage which is the luminance signal voltage or the reference voltage.

Each of the first signal line 151 and the second signal line 152 is connected to the signal line drive circuit 15 and the respective pixels belonging to the pixel column including the pixels 11A or 11B, and has a function of supplying: the reference voltage for detecting the threshold voltage of the drive TFT; and the signal voltage which determines luminance intensity.

It should be noted that, although not shown in FIG. 2A and FIG. 2B, the power source line 110 and the power source line 112 are a positive power source line and a negative power source line, respectively, and each is also connected to other pixels and to a voltage source. Furthermore, the fixed potential lines 119 and 120 are also connected to the other pixels and are connected to the voltage source.

Next, the inter-pixel connection relationship of the control line 131, the scanning line 133, the first signal line 151, and the second signal line 152 shall be described.

Figure 3:
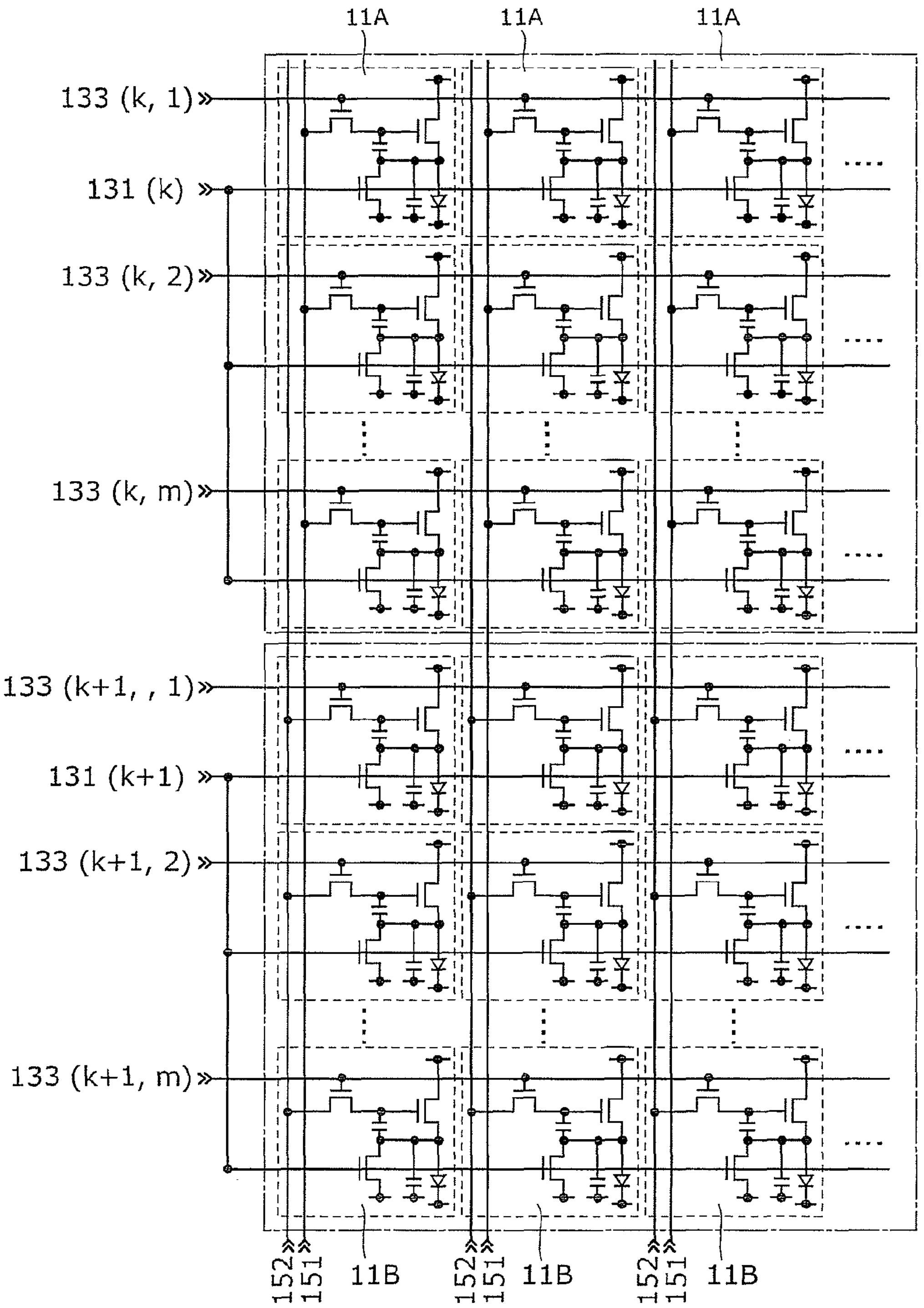
FIG. 3 is a circuit configuration diagram showing part of the display panel included in the display device according to the embodiment of the present invention.

FIG. 3 is a circuit configuration diagram showing part of the display panel included in the display device according to the embodiment of the present invention. The figure shows two adjacent drive blocks and respective control lines, respective scanning lines, and respective signal lines. In the figure and the subsequent description, the respective control lines, respective scanning lines, and respective signal lines shall be represented by "reference number (block number; row number of the block)" or "reference number (block number)".

As previously described, a drive block includes plural pixel rows, and there are two or more drive blocks within the display panel 10. For example, each of the drive blocks shown in FIG. 3 includes m rows of pixel rows.

In the k-th drive block shown at the top stage of FIG. 3, the control line 131 (k) is connected in common to the gates of the respective switching transistors 116 included in all the pixels 11A in the drive block. Meanwhile, each of the scanning lines 133 (k, 1) to 133 (k, m) are separately connected on a per pixel row basis.

Furthermore, the same connections as those in the k-th drive block are also carried out on the (k+1)-th drive block shown in the bottom stage of FIG. 3. However, the control line 131 (k) connected to the k-th drive block and the control line 131 (k+1) connected to the (k+1)-th drive block are different control lines, and separate control signals are outputted from the scanning/control line drive circuit 14. Specifically, the control lines 131 are shared by all of the pixels in a same one of the drive blocks, and are independent of another between different ones of the drive blocks. Here, control lines are shared in the same one of the drive blocks means that a single control signal outputted from the scanning/control line drive circuit 14 is simultaneously supplied to the control lines in the same one of the drive blocks. For example, in the same one of the drive blocks, a single control line connected to the scanning/control line drive circuit 14 branches out to the control lines 131 which are disposed on a per pixel row basis. Furthermore, the control lines are independent between different drive blocks means that separate control signals outputted from the scanning/control line drive circuit 14 are supplied to the plural drive blocks. For example, the control lines 131 are individually connected to the scanning/control line drive circuit 14 on a per drive block basis.

Furthermore, in the k-th drive block, the first signal line 151 is connected to the other of the source and drain of the respective switching transistors 115 included in all of the pixels 11A in the drive block. Meanwhile, in the (k+1)-th drive block, the second signal line 152 is connected to the other of the source and drain of the respective switching transistors 115 included in all of the pixels 11B in the drive block.

With the above-described formation of drive blocks, the number of the control lines 131 for controlling the connection between the source of the drive transistor 114 and the fixed potential line 119 is reduced. Therefore, the number of output lines of the scanning/control line drive circuit 14 which outputs drive signals to these control lines is reduced, thus allowing a reduction in circuit size.

Figure 4A:
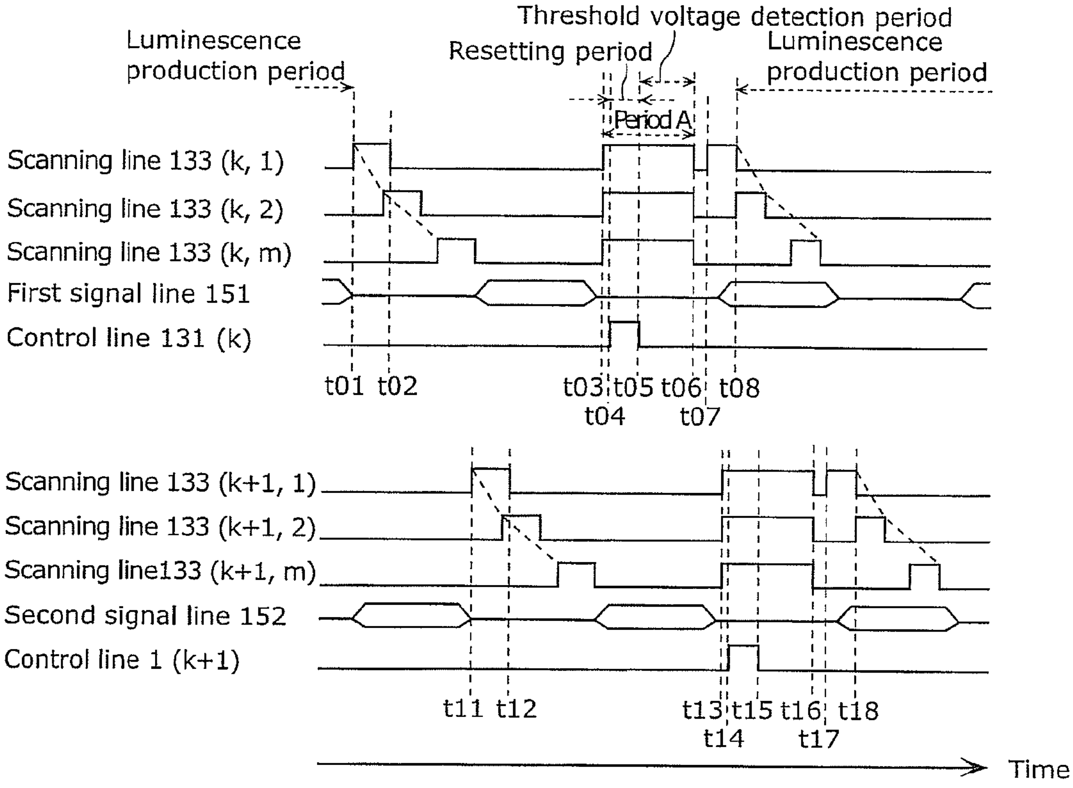
FIG. 4A is an operation timing chart for the driving method of the display device according to the embodiment of the present invention.

Next, the driving method of the display device 1 according to the present embodiment shall be described using FIG. 4A. It should be noted that, here, the driving method of the display device including the specific circuit configuration shown in FIG. 2A and FIG. 2B shall be described in detail.

Figure 5:
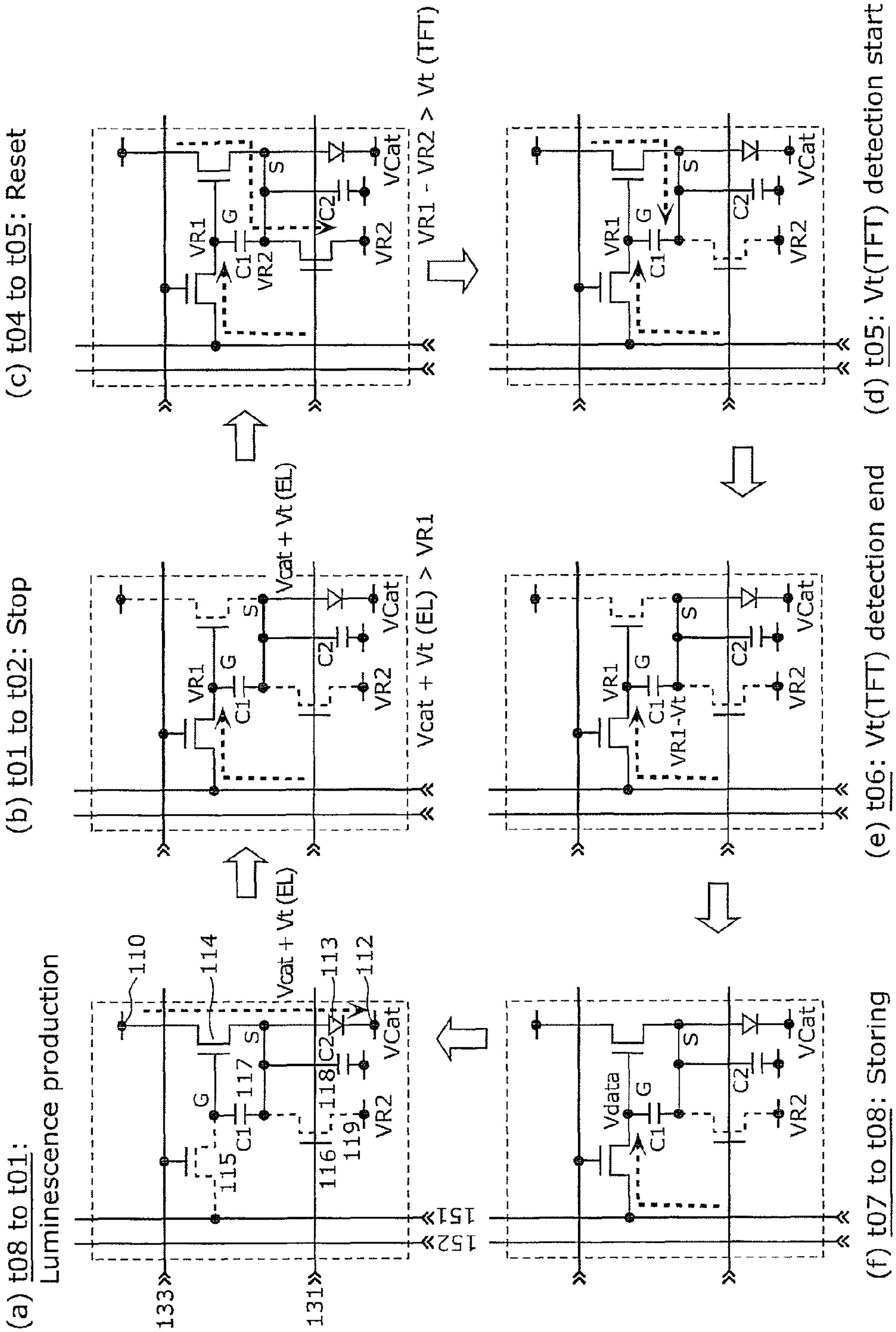
FIG. 5 is a state transition diagram for a pixel included in the display device according to the embodiment of the present invention.
Figure 6:
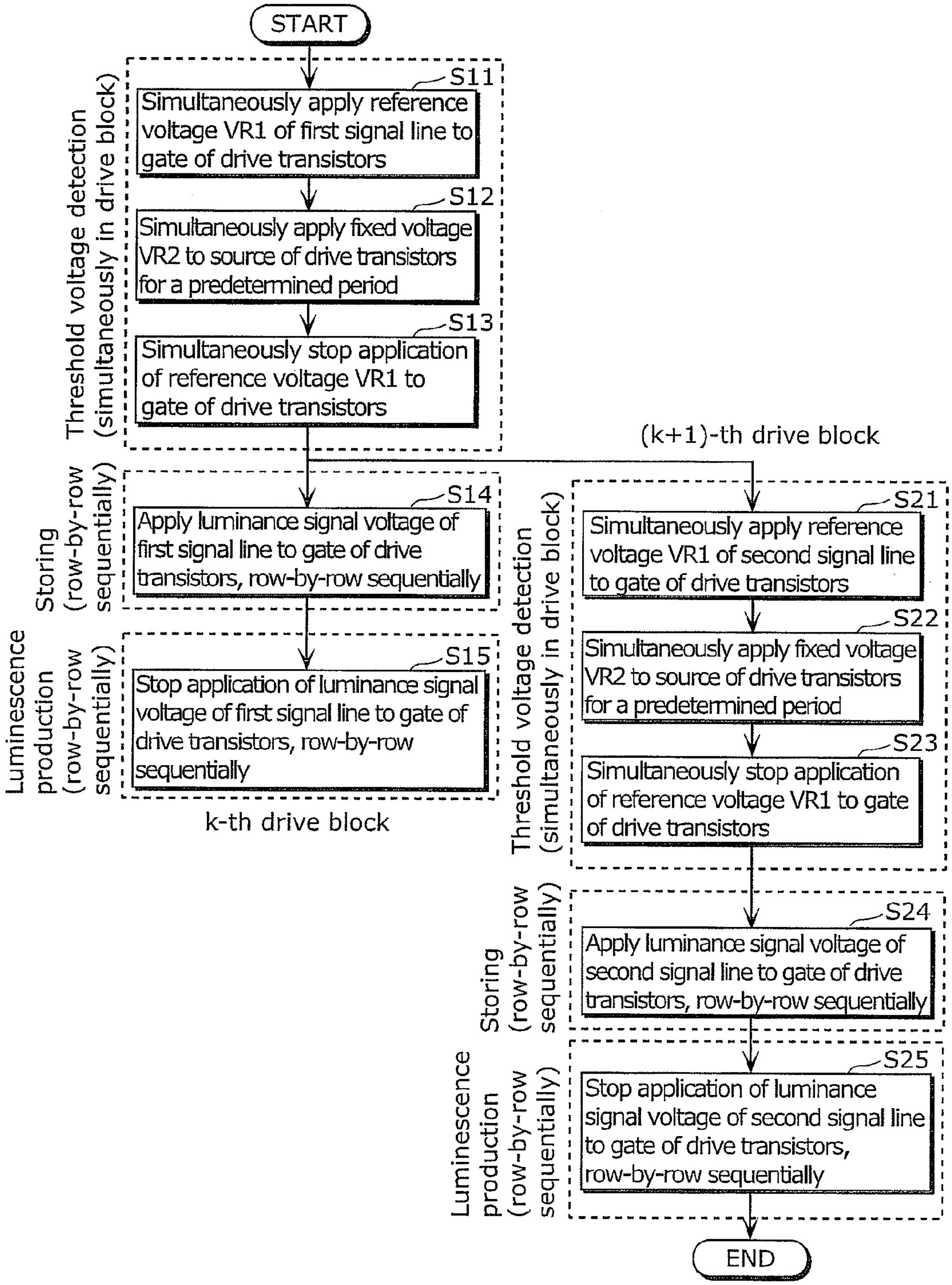
FIG. 6 is an operation flowchart for the display device according to the embodiment of the present invention.

FIG. 4A is an operation timing chart for the driving method of the display device according to the embodiment of the present invention. In the figure, the horizontal axis denotes time. Furthermore, in the vertical direction, the waveform diagrams of the voltage generated in the scanning lines 133 (k, 1), 133 (k, 2), and 133 (k, m), the first signal line 151, and the control line 131 (k) of the k-th drive block are shown in sequence from the top. Furthermore, continuing therefrom, the waveform diagrams of the voltage generated in the scanning lines 133 (k+1, 1), 133 (k+1, 2), and 133 (k+1, m), the second signal line 152, and the control line 131 (k+1) of the (k+1)-th drive block are shown. Furthermore, FIG. 5 is a state transition diagram for a pixel included in the display device according to the embodiment of the present invention. Furthermore, FIG. 6 is an operation flowchart for the display device according to the embodiment of the present invention.

First, at a time t01, the scanning/control line drive circuit 14 causes the voltage level of the scanning line 133 (k, 1) to change from LOW to HIGH so as to turn ON the respective switching transistors 115 included in the pixels in the first row. Furthermore, at this time, the signal line drive circuit 15 causes the signal voltage of the first signal line 151 to change from the luminance signal voltage to a reference voltage VR1. With this, as shown in (b) in FIG. 5, the photon generation of pixels in the first row in the k-th drive block is stopped through the application of the reference voltage VR1 to the gate of the respective drive transistors 114. At this time, when the gate potential of drive transistor 114 is $V_G$ and its source potential is $V_S$, $V_G$ and $V_S$ can be expressed by Expression 1.

[Math. 1]

$$V_G=VR1,\ V_S=Vt(\mathrm{EL})+Vcat \quad \text{(Expression 1)}$$

Here, Vt(EL) is the threshold voltage of the organic EL element 113, and $V_{CAT}$ is the potential of the power source line 112. $V_S$ is the potential in the photon generating state prior to the time t01 that is stored in the electrostatic storing capacitor 118. Furthermore, at this time, VR1 and $V_{CAT}$ are set according to the relationship shown in Expression 2. When the drive transistor threshold voltage Vt(TFT) is >0 V, VR1 and $V_{CAT}$ are, for example, 0 V.

[Math. 2]

$$Vt(\mathrm{EL})+Vt(\mathrm{TFT})+Vcat>VR1 \quad \text{(Expression 2)}$$

Specifically, since the gate-source voltage Vgs of the drive transistor 114 becomes Vgs−Vt (TFT)<0, the drive transistor 114 turns OFF.

Next, at a time t02, the scanning/control line drive circuit 14 causes the voltage level of the scanning line 133 (k, 1) to change from HIGH to LOW so as to turn ON the respective switching transistors 115 included in the pixels in the first row. With this, the stopping of the photon generation of the pixels in the first row is completed.

Next, the above-described stopping of the photon generation from the time t01 to the time t02 is executed, row-by-row sequentially, in the pixels from the second row to the m-th row in the k-th drive block.

Next, at a time t03, the scanning/control line drive circuit 14 causes the voltage levels of the scanning lines 133 (k, 1) to 133 (k, m) to simultaneously change from LOW to HIGH so as to turn ON the respective switching transistors 115 included in all of the pixels belonging to the k-th drive block (S11 in FIG. 6). Furthermore, at this timing, the signal line drive circuit 15 causes the signal voltage of the first signal line 151 to change from the luminance signal voltage to the reference voltage VR1 with which the drive transistor 114 is turned OFF. The operation of applying the aforementioned reference voltage to the gate of the drive transistor 114 corresponds to simultaneously applying the reference voltage in the k-th drive block.

Next, at the time t04, the scanning/control line drive circuit 14 causes the voltage level of the control lines 131 (k) to simultaneously change from LOW to HIGH so as to turn ON the respective switching transistors 116 included in all the pixels belonging to the k-th drive block. With this, as shown in (c) in FIG. 5, the fixed voltage VR2 is applied to the gate of the drive transistor 114 and the second electrode of the electrostatic storing capacitor 117 (S12 in FIG. 6). At this time, $V_G$ and $V_S$ is expressed using Expression 3.

[Math. 3]

$$V_G=VR1,\ V_S=VR2 \quad \text{(Expression 3)}$$

Here, VR2 is the fixed potential of the fixed potential line 119. Furthermore, at this time, VR1 and VR2 are set according to the relationship shown in Expression 4. VR2 is, for example, −5 V.

[Math. 4]

$$VR1-VR2>Vt(\text{TFT}) \quad \text{(Expression 4)}$$

Therefore, the gate-source voltage Vgs of the drive transistor 114 becomes 5 V for example, and thus the drive transistor 114 turns ON. At this time, the drive current flows in a path from the power supply line 110 to the drive transistor 114, to the second electrode of the electrostatic storing capacitor 117, and to the switching transistor 116 to the fixed potential line 119. The operation of applying the fixed voltage VR2 to the gate of the drive transistor 114 and the second electrode of the electrostatic storing capacitor 117 corresponds to simultaneously applying the fixed voltage in the k-th drive block.

Next, at a time t05, the scanning/control line drive circuit 14 causes the voltage level of the control lines 131 (k) to simultaneously change from HIGH to LOW so as to turn OFF the respective switching transistors 116 included in all of the pixels belonging to the k-th drive block. With this, as shown in (d) in FIG. 5, the discharge current flows in a path from the power supply line 110 to the drive transistor 114, to the second electrode of the electrostatic storing capacitor 117, and to the electrostatic storing capacitor 117. The discharge current continues until the Vgs of the drive transistor 114 becomes asymptotic to the threshold voltage Vt(TFT) of the drive transistor 114. Then, as shown in (e) in FIG. 5, when Vgs reaches the threshold voltage Vt(TFT) of the drive transistor 114, the drive transistor 114 turns OFF. At this time, $V_G$ and $V_S$ are expressed using Expression 5, and Vt(TFT) is stored in the electrostatic storing capacitor 117.

[Math. 5]

$$V_G=VR1,\ V_S=VR1-Vt(\text{TFT}) \quad \text{(Expression 5)}$$

It should be noted that although Vgs changes from (VR1−VR2) to Vt(TFT) between the time 05 and a time 06, the anode-cathode voltage of the organic EL element 113 is a voltage that is less than or equal to the threshold voltage Vt(EL) of the organic EL element 113, and thus current does not flow to the organic EL element 113.

Next, at the time t06, the scanning/control line drive circuit 14 causes the voltage levels of the scanning lines 133 (k, 1) to 133 (k, m) to simultaneously change from HIGH to LOW so as to turn OFF the respective switching transistors 115 included in all of the pixels belonging to the k-th drive block (S13 in FIG. 6). The above-described operation of turning OFF the switching transistor 115 to stop the supply of the reference voltage to the gate of the drive transistor 114 corresponds to the simultaneously causing non-conduction in the k-th drive block.

Simultaneously applying the reference voltage in the k-th drive block, simultaneously applying the fixed voltage in the k-th drive block, and simultaneously causing non-conduction in the k-th drive block which are described above correspond to the storing of the voltage (corresponding to a threshold voltage) in the k-th drive block.

It should be noted that, since the flowing discharge current for causing the voltage equivalent to the threshold voltage Vt(TFT) to be stored in the electrostatic storing capacitor 117 is minute, it takes time for the voltage stored in the electrostatic storing capacitor 117 to become asymptotic to the threshold voltage Vt(TFT) of the drive transistor 114 and reach the steady state. Therefore, the longer this period is, the more stable the voltage held in the electrostatic holding capacitor 117 becomes, and by ensuring that this period is sufficiently long, voltage compensation having high-precision is realized.

As described up to this point, in the period from the time t03 to the time t06, the correction of the threshold voltage Vt(TFT) of the drive transistors 114 is executed simultaneously in the k-th drive block, and voltage equivalent to the threshold voltage Vt(TFT) of the drive transistor 114 is simultaneously stored in the respective electrostatic storing capacitors 117 included in all of the pixels 11A in the k-th drive block.

Next, between the time t07 and the time t08, the scanning/control line drive circuit 14 causes the voltage level of the scanning line 133 (k, 1) to change from LOW to HIGH to LOW so as to turn ON the respective switching transistors 115 included in the pixels in the first row (S14 in FIG. 6). Furthermore, at this time, the signal line drive circuit 15 causes the signal voltage of the first signal line 151 to change from the reference voltage VR1 to the luminance signal voltage Vdata. With this, as shown in (f) in FIG. 5, the luminance signal voltage Vdata is applied to the gate of the drive transistor 114. At this time, the potential $V_S$ of the second electrode of the electrostatic storing capacitor 117 and the source of the drive transistor 114 becomes the sum of the voltage resulting from the distribution of the signal voltage change amount (Vdata−VR1) between C1 and C2, and (VR1−Vt (TFT)) which is the $V_S$ potential at the time t06, and is expressed using Expression 6.

[Math. 6]

$$V_S=\frac{C1}{C1+C2}(V_{data}-VR1)+VR1-Vt(TFT) \quad \text{Expression 6)}$$

The potential difference Vgs stored in the electrostatic storing capacitor 117 is the difference between $V_G$ and $V_S$ which is defined in Expression 6, and is expressed using Expression 7 following $V_G$=Vdata.

[Math. 7]

$$V_{gs} = \frac{C2}{C1 + C2}(V_{data} - VR1) + Vt(TFT) \quad \text{(Expression 7)}$$

In other words, a summed voltage obtained by adding a voltage corresponding to this luminance signal voltage Vdata and the voltage equivalent to the previously stored threshold voltage Vt(TFT) of the drive transistor 114 is stored into the electrostatic storing capacitor 117. The above-described operation of storing the summed voltage corresponds to the storing of a summed voltage in the k-th drive block.

Next, the above-described storing operation from the time t07 to the time t08 is executed, row-by-row sequentially, in the pixels from the second row to the m-th row in the k-th drive block.

Next, at the time t08, the scanning/control line drive circuit 14 causes the voltage level of the scanning line 133 (k, 1) to change from HIGH to LOW so as to turn OFF the respective switching transistors 115 included in the pixels in the first row (S15 in FIG. 6). At this time, Vgs is the voltage defined in Expression 7. Furthermore, because Vdata is, for example, between 0 to 5 V, Vgs is a voltage greater than or equal to Vt(TFT), the drive transistor 114 turns ON, drive current flows to the organic EL element 113, and the organic EL element 113 generates photons according to the Vgs defined in Expression 7. At this time, Vgs can be expressed using Expression 8, where the storing time is Δt.

[Math. 8]

$$-(C1 + C2)\frac{dV_{gs}}{dt} = \frac{\beta}{2}(V_{gs} - Vt(TFT))^2 \quad \text{(Expression 8)}$$

$$\Rightarrow \int_{V_{gs}(0)}^{V_{gs}(\Delta t)} \frac{dV_{gs}}{(V_{gs} - Vt(TFT))^2} = -\int_0^{\Delta t} \frac{\beta}{2(C1 + C2)} dt$$

$$\Rightarrow \left[-\frac{1}{V_{gs} - Vt(TFT)}\right]_{V_{gs}(0)}^{V_{gs}(\Delta t)} = -\frac{\beta \Delta t}{2(C1 + C2)}$$

$$\Rightarrow \frac{1}{V_{gs}(0) - Vt(TFT)} - \frac{1}{V_{gs}(\Delta t) - Vt(TFT)} = -\frac{\beta \Delta t}{2(C1 + C2)}$$

$$\Rightarrow V_{gs}(\Delta t) = Vt(TFT) + \frac{1}{\frac{1}{V_{gs}(0) - Vt(TFT)} + \frac{\beta \Delta t}{2(C1 + C2)}}$$

Next, the above-described photon generation at the time t08 is executed, row-by-row sequentially, in the pixels from the second row to the m-th row in the k-th drive block. In other words, the storing and the photon generation begin row-by-row sequentially in all the pixels 11A in the k-th drive block.

As described thus far, in the period from the time t08 onward, the photon generation in the organic EL elements 113 is executed row-by-row sequentially, in the k-th drive block. Here, a drain current $i_d$ flowing in the drive transistor 114 is expressed as in Expression 9, by using a voltage value obtained by deducting the threshold voltage Vt(TFT) of the drive transistor 114 from the Vgs defined in Expression 7.

[Math. 9]

$$i_d = \frac{\beta}{2}\left(\frac{1}{\frac{1}{V_{gs}(0) - Vt(TFT)} + \frac{\beta \Delta t}{2(C1 + C2)}}\right)^2 \quad \text{(Expression 9)}$$

Here, β is a characteristic parameter regarding mobility, gate insulating film capacitance, and the shape of the channel region of the drive transistor. Vgs(0) is expressed in Expression 10.

[Math. 10]

$$V_{gs}(0) = Vt(TFT) = \frac{C2}{C1 + C2}(V_{data} - VR1) \quad \text{(Expression 10)}$$

It can be seen from Expression 9 and Expression 10 that the drain current $i_d$ for causing the organic EL element 113 to generate photons is a current that is not dependent on the threshold voltage Vt(TFT) of the drive transistor 114.

As described thus far, by forming the pixel rows into drive blocks, the correction of the threshold voltage Vt(TFT) of the drive transistors 114 is executed simultaneously in the respective drive blocks. Furthermore, by forming the pixel rows into drive blocks, the control line 131 can be shared in the respective drive blocks.

Here, the comparison of luminescence duty defined according to the threshold voltage detection period is performed in the conventional image display device using the two signal lines described in Patent Reference 1, and the display device having the drive blocks according to the present invention.

Figure 7:
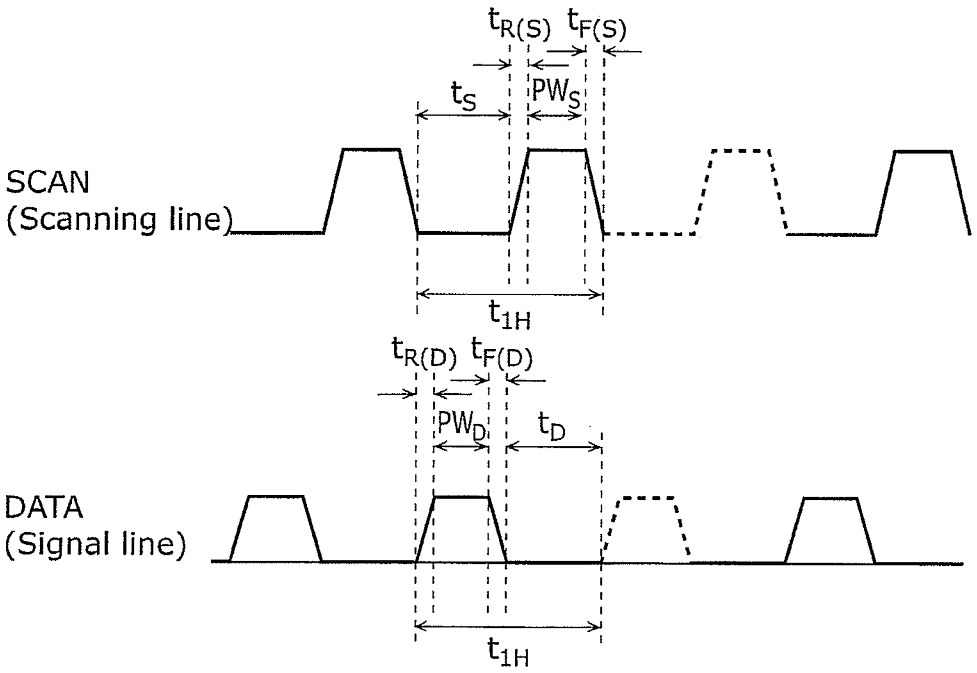
FIG. 7 is a diagram for describing the waveform characteristics of a scanning line and a signal line.

FIG. 7 is a diagram for describing the waveform characteristics of a scanning line and a signal line. In the figure, the period for detecting the threshold voltage Vt(TFT) in one horizontal period $t_{1H}$ for each pixel row is a period in which the reference voltage is applied to the electrostatic storing capacitor of the respective pixels and is equivalent to $PW_S$ which is the period in which the scanning line is at the HIGH level. Furthermore, for a signal line, one horizontal period $t_{1H}$ includes $PW_D$, which is a period in which signal voltage is supplied, and $t_D$ which is a period in which the reference voltage is supplied. Furthermore, assuming the rise time and fall time of $PW_s$ to be $t_{R(S)}$ and $t_{F(S)}$, respectively, and the rise time and fall time of $PW_D$ to be $t_{R(D)}$ and $t_{F(D)}$, respectively, one horizontal period $t_{1H}$ is expressed as in Expression 11.

[Math. 11]

$$t_{1H} = t_D + PW_D + t_{R(D)} + t_{F(D)} \quad \text{(Expression 11)}$$

In addition, assuming $PW_D = t_D$, one horizontal period $t_{1H}$ is expressed as in Equation 12.

[Math. 12]

$$t_D + PW_D + t_{R(D)} + t_{F(D)} = 2t_D + t_{R(D)} + t_{F(D)} \quad \text{(Expression 12)}$$

From Expression 11 and Expression 12, $t_D$ is expressed as in Expression 13.

[Math. 13]

$$t_D = (t_{1H} - t_{R(D)} - t_{F(D)})/2 \quad \text{(Expression 13)}$$

Furthermore, since the Vt(TFT) detection period must begin and end within the reference voltage generation period, $t_D$ is expressed using Expression 14 when a maximum Vt(TFT) detection period is secured.

[Math. 14]

$$t_D = PW_S + t_{R(S)} + t_{F(S)} \qquad \text{(Expression 14)}$$

From Expression 13 and Expression 14, $PW_S$ is expressed as in Expression 15.

[Math. 15]

$$PW_S = (t_{1H} - t_{R(D)} - t_{F(D)} - 2t_{R(S)} - 2t_{F(S)})/2 \qquad \text{(Expression 15)}$$

With respect to Expression 15, a comparison shall be made for the luminescence duty of a panel having a vertical resolution of 1,080 scanning lines (+30 lines for blanking) and which is driven at 120 Hz for example.

In the conventional image display device, one horizontal period $t_{1H}$ in the case of having two signal lines is twice that of the case of having one signal line, and is thus expressed through the subsequent Expression.

$t_{1H}$={1 sec./(120 Hz×1110 lines)}×2=7.5 μS×2=15 μS

Here, $t_{R(D)}=t_{F(D)}$=2 μS and $t_{R(S)}=t_{F(S)}$=1.5 μS are assumed, and when these are substituted into Expression 15, the Vt(TFT) detection period $PW_S$ becomes 2.5 μS.

Here, assuming that 1000 μS is required for a Vt(TFT) detection period to have sufficient precision, at least 1000 μS/2.5 μS=400 of horizontal period is needed as a non-luminescence production (non-photon generation) period in the horizontal period required for such Vt(TFT) detection. Therefore, the luminescence duty of the conventional image display device using two signal lines becomes (1110 horizontal period−400 horizontal period)/1110 horizontal period=64% or less.

Next, the luminescence duty of the display device having the drive blocks according to the present invention shall be calculated. Assuming that 1000 μS is required for a Vt(TFT) detection period to have sufficient precision as in the above described condition, in the case of block driving, a period A (threshold voltage detection preparation period+threshold voltage detection period) shown in FIG. 4A is equivalent to the aforementioned 1000 μS. In this case, the non-luminescence production period for one frame becomes at least 1000 μS×2=2000 μS since the aforementioned period A and writing time are included. Therefore, the luminescence duty of the display device having the drive blocks according to the present invention is (1 frame time−2000 μS)/1 frame time, and by substituting (1 sec./120 Hz) as the 1 frame time, is 76% or less.

According to the above comparison result, compared to the conventional image display device using two signal lines, combining block driving as in the present invention ensures a longer luminescence duty even when the same threshold voltage detection period is set. Therefore, it is possible to realize a display device that ensures sufficient luminescence luminance and has long operational life due to reduced output load on drive circuits.

Conversely, it is understood that when the same luminescence duty is set to the conventional image display device using two signal lines and the display device combining block driving as in the present invention, the display device according to the present invention ensures a longer threshold voltage detection period.

The driving method of the display device 1 according to the present embodiment shall be described once again.

On the other hand, the threshold voltage detection period for the drive transistors 114 in the (k+1)-th drive block is started immediately after the time t06 at which the threshold voltage detection period for the drive transistors 114 in the k-th drive block is completed.

First, in a time t11 immediately following the completion of the stopping of photon generation of the pixels in the m-th row of the k-th drive block, the scanning/control line drive circuit 14 causes the voltage level of the scanning line 133 (k+1, 1) to change from LOW to HIGH so as to turn ON the respective switching transistors 115 included in the pixels in the first row. Furthermore, the signal line drive circuit 15 causes the signal voltage of the second signal line 152 to change from the luminance signal voltage to the reference voltage VR1 with which the drive transistor 114 turns OFF. With this, the photon generation of pixels in the first row in the (k+1)-th drive block is stopped through the application of the reference voltage VR1 to the gate of the respective drive transistors 114.

Next, at a time t12, the scanning/control line drive circuit 14 causes the voltage level of the scanning line 133 (k+1, 1) to change from HIGH to LOW so as to turn OFF the respective switching transistors 115 included in the pixels in the first row. With this, the stopping of the photon generation of the pixels in the first row is completed.

Next, the above-described stopping of photon generation from the time t11 to the time t12 is executed, row-by-row sequentially, in the pixels from the second row to the m-th row in the (k+1)-th drive block.

Next, in the time t13 immediately following a time t07 at which the period for detecting the threshold voltage of the drive transistors 114 in the k-th drive block ends and the storing operation is started, the scanning/control line drive circuit 14 causes the voltage levels of the scanning lines 133 (k+1, 1) to 133 (k+1, m) to simultaneously change from LOW to HIGH so as to turn ON the respective switching transistors 115 included in all of the pixels belonging to the (k+1)-th drive block (S21 in FIG. 6). Furthermore, at this timing, the signal line drive circuit 15 causes the signal voltage of the second signal line 152 to change from the luminance signal voltage to the reference voltage VR1 with which the drive transistor 114 is turned OFF. The operation of applying the aforementioned reference voltage to the gate of the drive transistor 114 corresponds to simultaneously applying the reference voltage in the (k+1)-th drive block.

Next, at a time t14, the scanning/control line drive circuit 14 causes the voltage level of the control lines 131 (k+1) to simultaneously change from LOW to HIGH so as to turn ON the respective switching transistors 116 included in all of the pixels belonging to the (k+1)-th drive block. With this, the fixed voltage VR2 is applied to the gate of the drive transistor 114 and the second electrode of the electrostatic storing capacitor 117 (S22 in FIG. 6). At this time, the drive current flows in a path from the power supply line 110 to the drive transistor 114, to the second electrode of the electrostatic storing capacitor 117, to the switching transistor 116, and to the fixed potential line 119. The operation of applying the fixed voltage VR2 to the gate of the drive transistor 114 and the second electrode of the electrostatic storing capacitor 117 corresponds to simultaneously applying the fixed voltage in the (k+1)-th drive block.

Next, at a time t15, the scanning/control line drive circuit 14 causes the voltage level of the control lines 131 (k+1) to simultaneously change from HIGH to LOW so as to turn OFF the respective switching transistors 116 included in all of the pixels belonging to the (k+1)-th drive block. With this, the discharge current starts to flows in a path from the power supply line 110 to the drive transistor 114, to the second electrode of the electrostatic storing capacitor 117, and to the electrostatic storing capacitor 117. The discharge current continues until the Vgs of the drive transistor 114 becomes asymptotic to the threshold voltage Vt(TFT) of the drive transistor 114. Then, when Vgs reaches the threshold voltage Vt(TFT) of the drive transistor 114, the drive transistor 114 turns OFF.

It should be noted that although Vgs changes from (VR1−VR2) to Vt(TFT) between the time 15 and a time 16, the anode-cathode voltage of the organic EL element 113 is a negative voltage, and thus current does not flow to the organic EL element 113.

Next, at the time t16, the scanning/control line drive circuit 14 causes the voltage levels of the scanning lines 133 (k+1, 1) to 133 (k+1, m) to simultaneously change from HIGH to LOW so as to turn OFF the respective switching transistors 115 included in all of the pixels belonging to the (k+1)-th drive block (S23 in FIG. 6). The above-described operation of turning OFF the switching transistor 115 to stop the supply of the reference voltage to the gate of the drive transistor 114 corresponds to simultaneously causing non-conduction in the (k+1)-th drive block.

Simultaneously applying the reference voltage in the (k+1)-th drive block, simultaneously applying the fixed voltage in the (k+1)-th drive block, and simultaneously causing non-conduction in the (k+1)-th drive block which are described above correspond to the storing of the voltage (corresponding to a threshold voltage) in the (k+1)-th drive block.

It should be noted that, since the flowing discharge current for causing the voltage equivalent to the threshold voltage Vt(TFT) to be stored in the electrostatic storing capacitor 117 is minute, it takes time for the voltage stored in the electrostatic storing capacitor 117 to become asymptotic to the threshold voltage Vt(TFT) of the drive transistor 114 and reach the steady state. Therefore, the longer this period is, the more stable the voltage held in the electrostatic holding capacitor 117 becomes, and by ensuring that this period is sufficiently long, voltage compensation having high-precision is realized.

As described thus far, in the period from the time t13 to the time t16, the correction of the threshold voltage Vt(TFT) of the drive transistor 114 is executed simultaneously in the (k+1)-th drive block, and a voltage corresponding to the threshold voltage Vt(TFT) of the drive transistor 114 is stored simultaneously in the respective electrostatic storing capacitors 117 of all the pixels 11A in the (k+1)-th drive block.

Next, between a time t17 and a time t18, the scanning/control line drive circuit 14 causes the voltage level of the scanning line 133 (k+1, 1) to change from LOW to HIGH to LOW so as to turn ON the respective switching transistors 115 included in the pixels in the first row (S24 in FIG. 6). Furthermore, at this time, the signal line drive circuit 15 causes the signal voltage of the second signal line 152 to change from the reference voltage VR1 to the luminance signal voltage Vdata. With this, the luminance signal voltage Vdata is applied to the gate of the drive transistor 114. In other words, a summed voltage obtained by adding a voltage corresponding to this luminance signal voltage Vdata and the voltage equivalent to the previously stored threshold voltage Vt(TFT) of the drive transistor 114 is stored into the electrostatic storing capacitor 117.

Next, the above-described storing operation from the time t17 to the time t18 is executed, row-by-row sequentially, in the pixels from the second row to the m-th row in the (k+1)-th drive block.

Next, at the time t18, the scanning/control line drive circuit 14 causes the voltage level of the scanning line 133 (k+1, 1) to change from HIGH to LOW so as to turn OFF the respective switching transistors 115 included in the pixels in the first row (S25 in FIG. 6). At this time, Vgs is a voltage greater than or equal to Vt(TFT), the drive transistor 114 is ON, drive current flows to the organic EL element 113 such that the organic EL element 113 generates photons according to the Vgs defined in Expression 7.

Next, the above-described photon generation operation at the time t18 is executed, row-by-row sequentially, in the pixels from the second row to the m-th row in the (k+1)-th drive block. In other words, the storing and the photon generation begin row-by-row sequentially in all the pixels 11B in the (k+1)-th drive block.

As described thus far, in the period from the time t18 onward, the photon generation in the organic EL elements 113 is executed row-by-row sequentially, in the (k+1)-th drive block.

As described thus far, by forming the pixel rows into drive blocks, the correction of the threshold voltage Vt(TFT) of the drive transistors 114 is executed simultaneously in the respective drive blocks. Furthermore, by forming the pixel rows into drive blocks, the control line 131 can be shared in the respective drive blocks.

Furthermore, although the scanning lines 133 (k+1, 1) to 133 (k+1, m) are separately connected to the scanning/control line drive circuit 14, the timing of the drive pulse in the threshold voltage correction period is the same. Therefore, the scanning/control line drive circuit 14 can suppress the rising of the frequency of the pulse signals to be outputted, and thus the output load on the drive circuit is reduced.

As described thus far, in the period from the time t17 onward, the photon generation in the organic EL elements 113 is executed simultaneously in the (k+1)-th drive block.

The operations described thus far are also executed sequentially in the (k+2)-th drive block onward in the display panel 10.

Figure 4B:
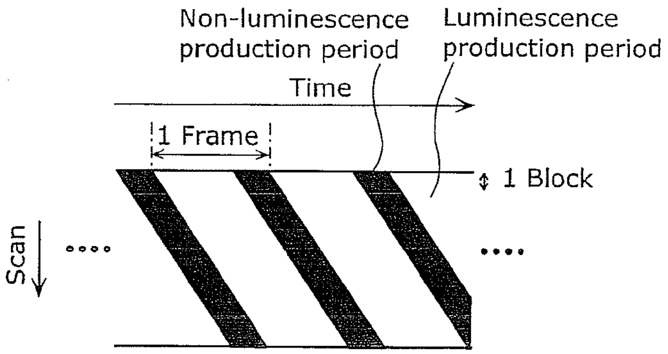
FIG. 4B is a state transition diagram of drive blocks which generate photons according to the driving method according to the embodiment of the present invention.

FIG. 4B is a state transition diagram of drive blocks which generate photons according to the driving method according to the embodiment of the present invention. In the figure, the luminescence production periods and the non-luminescence production periods of each drive block in a certain pixel column is shown. Plural drive blocks are shown in the vertical direction, and the horizontal axis shows time. Here, the non-luminescence production period includes the above-described threshold voltage correction period.

According to the driving method of the display device according to embodiment of the present invention, the luminescence production periods are sequentially set on a per pixel row basis even within the same drive block. Therefore, even within a drive block, the luminescence production periods appear in a continuous manner with respect to the row scanning direction.

As described thus far, the drive transistor 114 threshold voltage correction periods as well as the timings thereof can be made uniform within the same drive block through the luminescence pixel circuits in which the switching transistor 116 and the electrostatic holding capacitor 118 are provided, the arrangement of the control lines, scanning lines, and signal lines to the respective pixels that are formed into drive blocks, and the above-described driving method. Therefore, the load on the scanning/control line drive circuit 14 which outputs signals for controlling current paths, and on the signal line drive circuit 15 which controls signal voltages is reduced. In addition, through the above-described forming of drive blocks and the two signal lines arranged for every pixel column, the drive transistor 114 threshold voltage correction period can take a large part of a 1 frame period Tf which is the time in which all the pixels are refreshed. This is because the threshold voltage correction period is provided in the (k+1)-th drive block in the period in which the luminance signal is sampled in the k-th drive block. Therefore, the threshold voltage correction period is not divided on a per pixel row basis, but is divided on a per drive block basis. Thus, even when the display area is increased, a long relative threshold voltage correction period with respect to a 1 frame period can be set without a significant increase in the number of outputs of the scanning/control line drive circuit 14 and without reducing luminescence duty. With this, a drive current based on luminance signal voltage that has been corrected with a high degree of precision flows to the luminescence elements, and thus image display quality improves.

For example, in the case where the display panel 10 is divided into N drive blocks, the threshold voltage correction period allocated to each pixel is at most Tf/N. Here, the threshold voltage correction period in the present invention is made up of a reset period and the threshold voltage detection period in the timing chart shown in FIG. 4A. In contrast, in the case where the threshold voltage correction period is set at a different timing for each of the pixel rows, and it is assumed that there are M rows of pixel rows (M>>N), threshold voltage correction period allocated to each pixel is at most Tf/M. Furthermore, even in the case where two signal lines are disposed for each pixel column as disclosed in Patent Reference 1, threshold voltage correction period allocated to each pixel is at most 2Tf/M.

Furthermore, with the above-described formation of drive blocks, the control line for controlling the conduction between the source of the drive transistor 114 and the fixed potential line 119 can be shared within the respective drive blocks. Therefore, the number of control lines outputted from the scanning/control line drive circuit 14 is reduced. Therefore, the load on the drive circuit is reduced.

For example, in the conventional image display device 500 disclosed in Patent Reference 1, two control lines (power supply line and scanning line) are disposed per pixel row. Assuming that the image display device 500 includes M rows of pixel rows, the control lines would total 2M lines.

In contrast, in the display device 1 according to the embodiment of the present invention, one scanning line per pixel row and one control line per drive block are outputted from the scanning/control line drive circuit 14. Therefore, assuming that the display device 1 includes M rows of pixel rows, the control lines (including scanning lines) would total (M+N) lines.

Since M>>N is realized in the case of a large surface area and a large number of rows of pixels, in such case, the number of control lines in the display device 1 according to the present invention can be reduced to approximately half compared to the number of control lines in the conventional image display device 500.

Although the embodiment has been described thus far, the display device according to the present invention is not limited to the above-described embodiment. The present invention includes other embodiments implemented through a combination of arbitrary components of the embodiment, or modifications obtained through the application of various modifications to the embodiment that may be conceived by a person of ordinary skill in the art, that do not depart from the essence of the present invention, or various devices in which the display device according to the present invention is built into.

It should be noted that although, in the aforementioned embodiments, description is carried out under the assumption that the switching transistors are n-type transistors which turn ON when the voltage level of the gate of switching transistor is HIGH, the same advantageous effect is produced as in the respective embodiments even with an image display device in which the switching transistors are configured of p-type transistors and the polarity of the scanning are reversed.

Furthermore, although in the above-described embodiments the cathode-side of the respective organic EL elements is connected in common with another pixel, the same advantageous effect is produced as in the respective embodiments even with an image display device in which the anode-side is shared and the cathode-side is connected to a pixel circuit.

Figure 8:
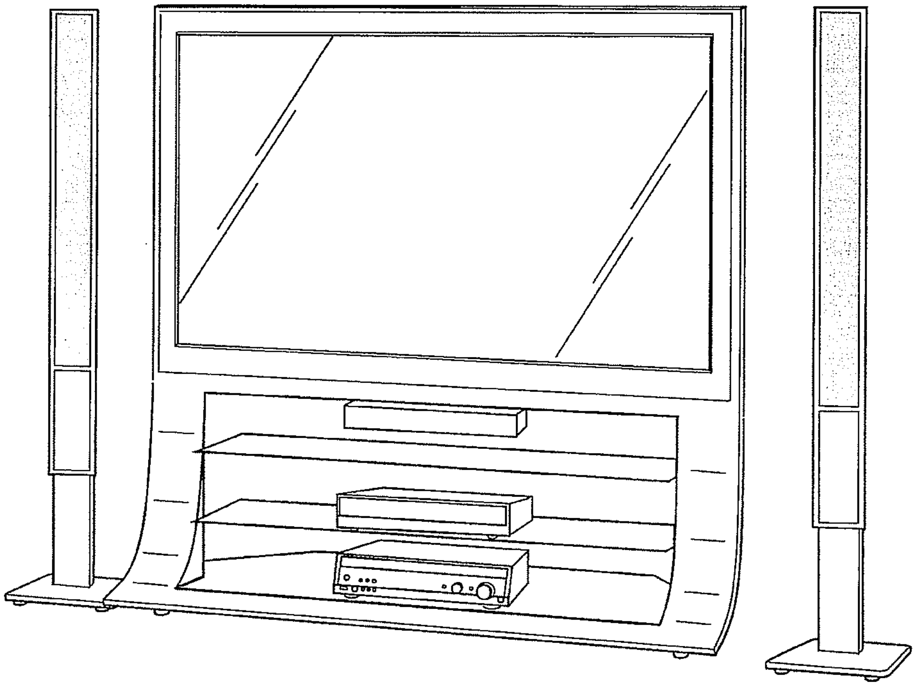
FIG. 8 is an external view of a thin flat-screen TV incorporating the display device in the present invention.
Figure 9:
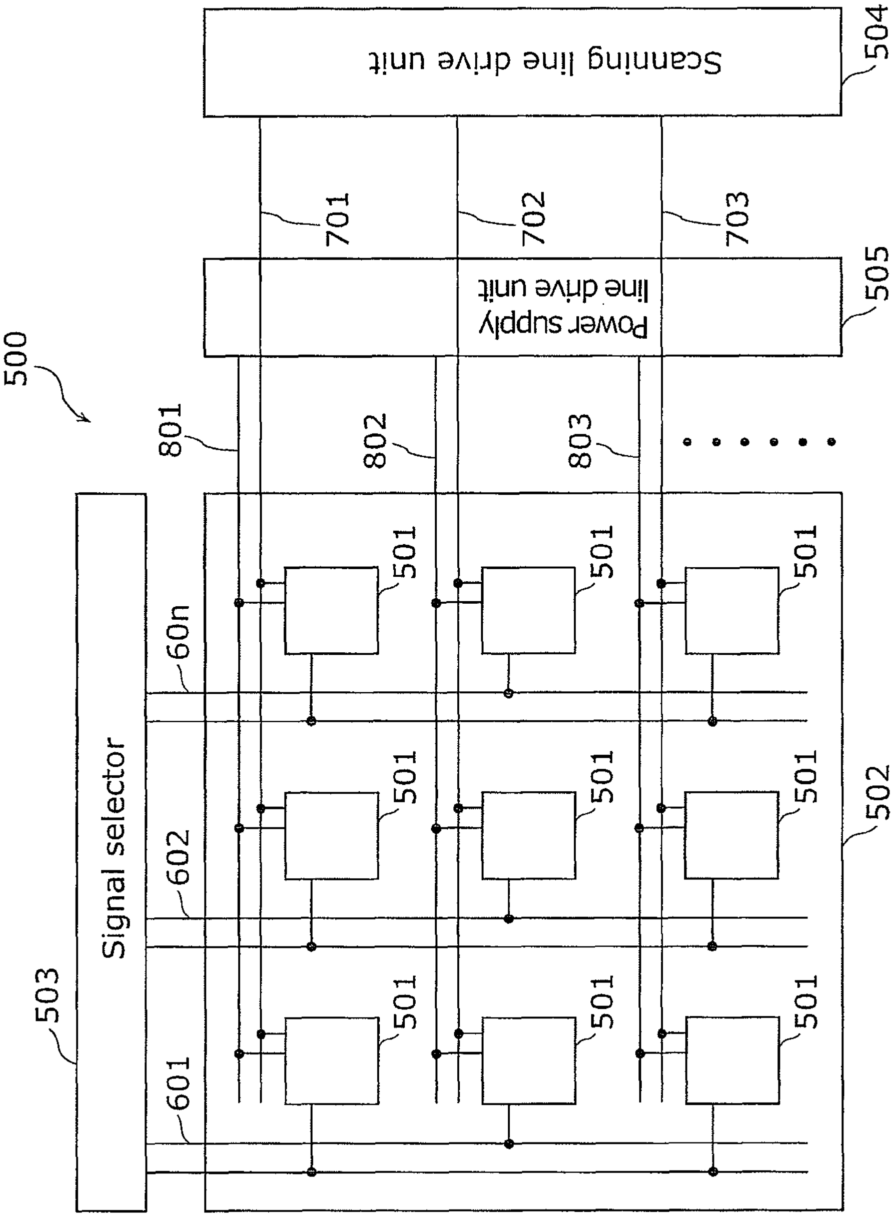
FIG. 9 is a block diagram showing the configuration of a conventional image display device disclosed in Patent Reference 1.
Figure 10:
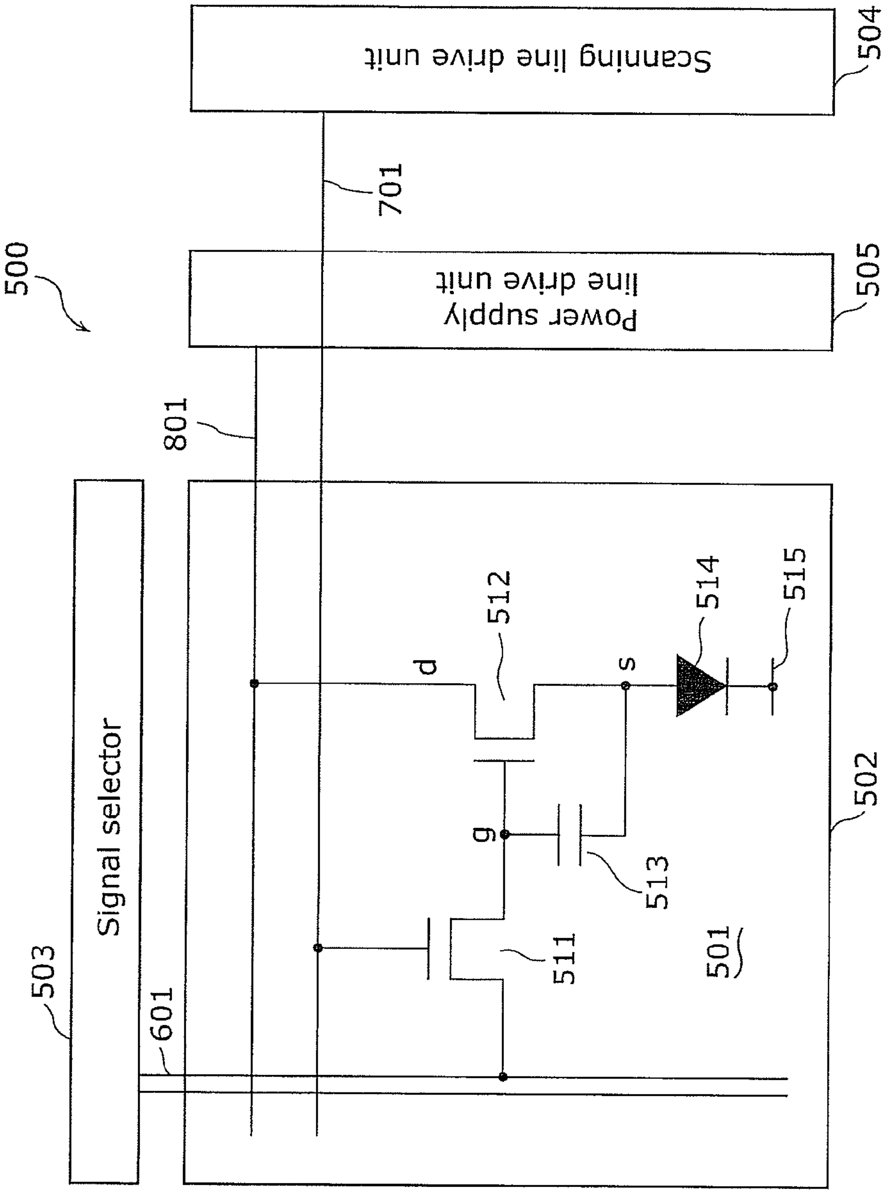
FIG. 10 is a circuit configuration diagram for a pixel included in the conventional image display device disclosed in Patent Reference 1.
Figure 11:
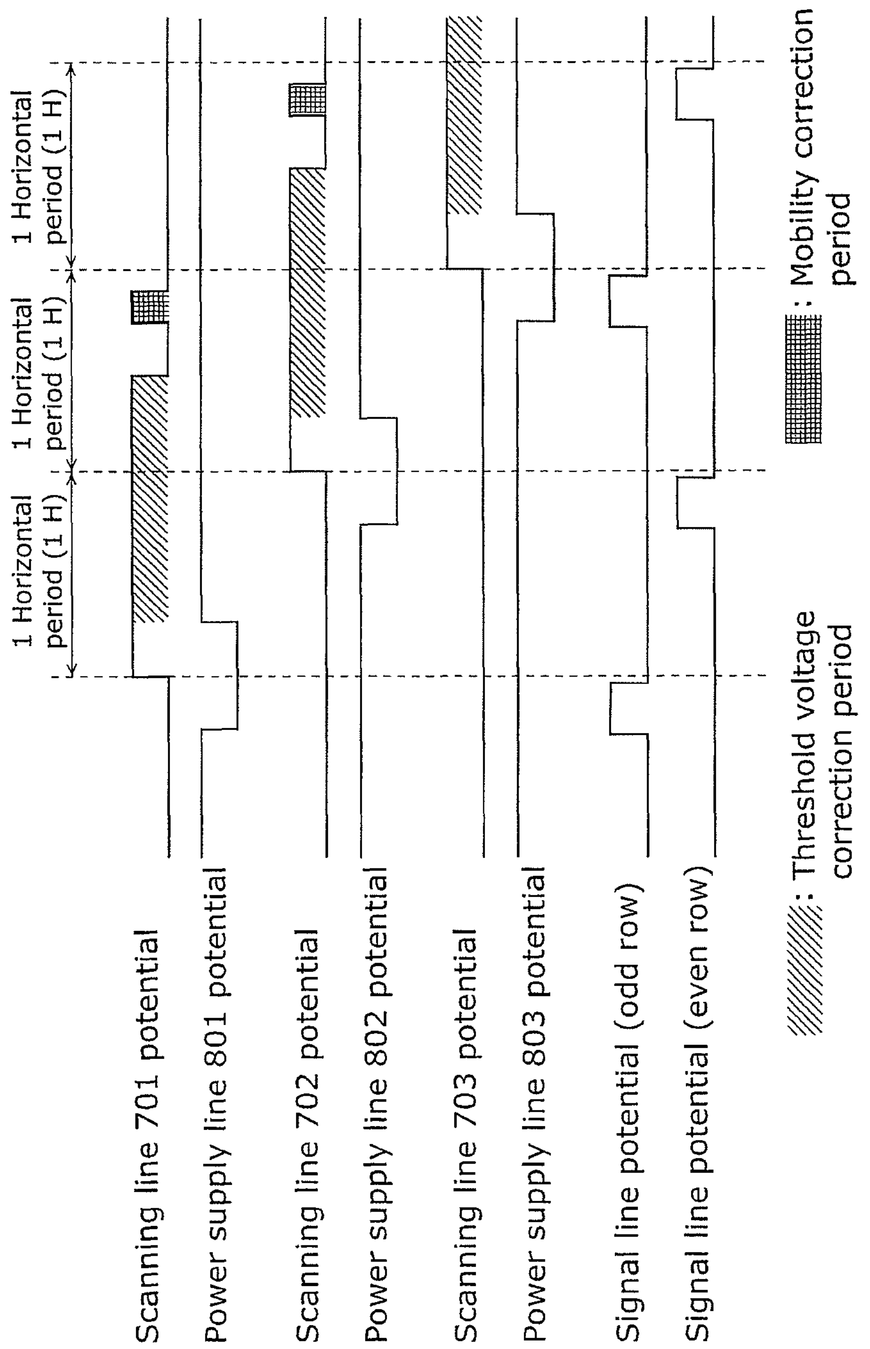
FIG. 11 is an operation timing chart for the image display device disclosed in Patent Reference 1.

Furthermore, for example, the display device according to the present invention is built into a thin flat-screen TV such as that shown in FIG. 8. A thin flat-screen TV capable of high-accuracy image display reflecting a video signal is implemented by having the display device according to the present invention built into the TV.

Although only an embodiment of the present invention has been described in detail above, those skilled in the art will readily appreciate that many modifications are possible in the exemplary embodiment without materially departing from the novel teachings and advantages of the present invention. Accordingly, all such modifications are intended to be included within the scope of this invention.

INDUSTRIAL APPLICABILITY

The present invention is particularly useful in an active-type organic EL flat panel display which causes luminance to fluctuate by controlling pixel photon generation intensity according to a pixel signal current.

What is claimed is:

1. A display device including pixels arranged in rows and columns, the display device comprising:

a first signal line and a second signal line that are disposed in each of the columns, for supplying the pixels in the corresponding column with a signal voltage that determines luminance of the pixels;

a first power source line and a second power source line;

a scanning line disposed in each of the rows; and a control line disposed in each of the rows, wherein the pixels compose at least two drive blocks, each of the drive blocks including plural pixel rows, each of the pixels includes:

a luminescence element that includes terminals, one of the terminals being connected to the second power source line, and the luminescence element generating photons according to a flow of a signal current corresponding to the signal voltage;

a drive transistor that includes a gate, a source, and a drain, one of the source and the drain being connected to the first power source line, the other of the source and the drain being connected to the other of the terminals of the luminescence element, and the drive transistor converting the signal voltage applied between the gate and the source of the drive transistor into the signal current;

a capacitor element that includes terminals, one of the terminals being connected to the gate of the drive transistor, and the other of the terminals being connected to the source of the drive transistor; and a first switching transistor that includes a gate connected to the control line, one of a source and a drain connected to the other of the terminals of the capacitor element, and the other of the source and the drain connected to a fixed potential line, each of the pixels in a k-th drive block of the drive blocks further includes a second switching transistor that includes a gate connected to the scanning line, one of a source and a drain connected to the gate of the drive transistor, and the other of the source and the drain connected to the first signal line, k being a positive integer, each of the pixels in a (k+1)-th drive block of the drive blocks further includes a third switching transistor that includes a gate connected to the scanning line, one of a source and a drain connected to the gate of the drive transistor, and the other of the source and the drain connected to the second signal line, each of the control lines is connected to all of the pixels in a same one of the drive blocks and not connected to the pixels in different ones of the drive blocks, the signal voltage includes a luminance signal voltage for causing the luminescence element to generate photons and a reference voltage for causing a voltage corresponding to a threshold voltage of the drive transistor to be stored in the capacitor element, the display device further comprises:

a signal line drive circuit that outputs the signal voltage to the first signal line and the second signal line; and a timing control circuit that controls the timing at which the signal line drive circuit outputs the signal voltage, the timing control circuit (i) causes the signal line drive circuit to output the reference voltage to the second signal line when the signal line drive circuit is outputting the luminance signal voltage to the first signal line, and (ii) causes the signal line drive circuit to output the reference voltage to the first signal line when the signal line drive circuit is outputting the luminance signal voltage to the second signal line, and a threshold voltage correction period, in which the reference voltage is applied to the (k+1)-th drive block for threshold voltage correction, is provided in a signal voltage storing period in which the signal voltage is sampled in the k-th drive block.

2. The display device according to claim 1, wherein each of the pixels further includes a second capacitor element inserted between the source of the drive transistor and the fixed potential line.

3. The display device according to claim 1, further comprising a drive circuit which drives each of the pixels by controlling the first signal line, the second signal line, the control line, and the scanning line, the wherein the drive circuit:

simultaneously applies a reference voltage from the first signal line to the gate of the drive transistor of each of the pixels in the k-th drive block by simultaneously applying a voltage, from the scanning line, which turns ON the second switching transistor of each of the pixels in the k-th drive block;

simultaneously applies a fixed voltage from the fixed potential line to the source of the drive transistor of each of the pixels in the k-th drive block by simultaneously applying a voltage, from the control line, which turns ON the first switching transistor of each of the pixels in the k-th drive block, the fixed voltage being lower than the reference voltage by at least a threshold voltage of the drive transistor;

simultaneously causes non-conduction between the first signal line and the gate of the drive transistor of each of the pixels in the k-th drive block by simultaneously applying a voltage, from the scanning line, which turns OFF the second switching transistor of each of the pixels in the k-th drive block;

simultaneously applies the reference voltage from the second signal line to the gate of the drive transistor of each of the pixels in the (k+1)-th drive block by simultaneously applying a voltage, from the scanning line, which turns ON the third switching transistor of each of the pixels in the (k+1)-th drive block;

simultaneously applies the fixed voltage to the source of the drive transistor of each of the pixels in the (k+1)-th drive block by simultaneously applying the voltage, from the control line, which turns ON the first switching transistor of each of the pixels in the (k+1)-th drive block; and simultaneously causes non-conduction between the second signal line and the gate of the drive transistor of each of the pixels in the (k+1)-th drive block by simultaneously applying the voltage, from the scanning line, which turns OFF the third switching transistor of each of the pixels in the (k+1)-th drive block.

4. The display device according to claim 1, wherein, where a period of time for refreshing all of the pixels is Tf, and a total number of the drive blocks is N, a period of time for detecting a threshold voltage of the drive transistor is at most Tf/N.

5. A method of driving a display device in which pixels are arranged in rows and columns and compose at least two drive blocks, each of the pixels including a drive transistor and a luminescence element, each of the drive blocks including plural pixel rows, the drive transistor converting one of a luminance signal voltage and a reference voltage supplied by one of signal lines into a signal current corresponding to the one of a luminance signal voltage and the reference voltage, and the luminescence element generating photons according to a flow of the signal current, the method comprising:

storing a voltage corresponding to a threshold voltage of a corresponding drive transistor, simultaneously, in a capacitor element connected to a gate and a source of the drive transistor of each of the pixels in a k-th drive block of the drive blocks, k being a positive integer;

storing a summed voltage, in a pixel row-sequence, in the capacitor element of each of the pixels in the k-th drive block, after the storing of the voltage in the k-th drive block, the summed voltage being obtained by adding the luminance signal voltage to the voltage corresponding to the threshold voltage; and storing a voltage corresponding to a threshold voltage of a corresponding drive transistor, simultaneously, in a capacitor element in each of the pixels in a (k+1)-th drive block of the drive blocks, after the storing of the voltage in the k-th drive block, wherein the storing of the voltage in the k-th drive block includes:

simultaneously applying the reference voltage from a first signal line to the gate of the drive transistor of each of the pixels in the k-th drive block, the first signal line being disposed in each of the columns;

simultaneously applying a fixed voltage from a fixed potential line to the source of the drive transistor of each of the pixels in the k-th drive block, for a predetermined period, after simultaneously applying the reference voltage in the k-th drive block, the fixed voltage being lower than the reference voltage by at least a threshold voltage of the drive transistor, and the fixed potential line being disposed in common for all of the pixels; and simultaneously causing non-conduction between the first signal line and the gate of the drive transistor of each of the pixels in the k-th drive block, after simultaneously applying the fixed voltage in the k-th drive block, the storing of the voltage in the (k+1)-th drive block includes:

simultaneously applying the reference voltage from a second signal line to the gate of the drive transistor of each of the pixels in the (k+1)-th drive block, the second signal line being disposed in each of the columns;

simultaneously applying the fixed voltage from the fixed potential line to a source of the drive transistor of each of the pixels in the (k+1)-th drive block, for the predetermined period, after simultaneously applying the reference voltage in the (k+1)-th drive block, a control line being disposed in each of the rows and connected to all of the pixels in a same one of the drive blocks and not connected to the pixels in different ones of the drive blocks; and simultaneously causing non-conduction between the second signal line and the gate of the drive transistor of each of the pixels in the (k+1)-th drive block, after simultaneously applying the fixed voltage in the (k+1)-th drive block, the luminance signal voltage causing the luminescence element to generate photons and a reference voltage for causing a voltage corresponding to a threshold voltage of the drive transistor to be stored in the capacitor element, the display device further comprises:

a signal line drive circuit that outputs the signal voltage to the first signal line and the second signal line; and a timing control circuit that controls the timing at which the signal line drive circuit outputs the signal voltage, the timing control circuit (i) causes the signal line drive circuit to output the reference voltage to the second signal line when the signal line drive circuit is outputting the luminance signal voltage to the first signal line, and (ii) causes the signal line drive circuit to output the reference voltage to the first signal line when the signal line drive circuit is outputting the luminance signal voltage to the second signal line, and a threshold voltage correction period, in which the reference voltage is applied to the (k+1)-th drive block for threshold voltage correction, is provided in a signal voltage storing period in which the signal voltage is sampled in the k-th drive block.

6. The method according to claim 5, wherein each of the pixels includes terminals, one of the terminals being connected to a first power source line and the other of the terminals being connected to the source of the drive transistor, in simultaneously applying the reference voltage in the k-th drive block, the reference voltage is applied from the first signal line to the gate of the drive transistor by causing conduction of a second switching transistor included in each of the pixels in the k-th drive block, the second switching transistor including (i) a gate connected to a corresponding one of scanning lines each disposed in a corresponding one of the rows, (ii) one of a source and a drain connected to the gate of the drive transistor, and (ii) the other of the source and the drain connected to the first signal line, in simultaneously applying the reference voltage in the (k+1)-th drive block, the reference voltage is applied from the second signal line to the gate of the drive transistor by causing conduction of a third switching transistor included in each of the pixels in the (k+1)-th drive block, the third switching transistor including (i) a gate connected to a corresponding one of the scanning lines, (ii) one of a source and a drain connected to the gate of the drive transistor, and (ii) the other of the source and the drain connected to the second signal line, in simultaneously applying the fixed voltage in the k-th drive block and simultaneously applying the fixed voltage in the (k+1)-th drive block, the fixed voltage is applied to the source of the corresponding drive transistor by causing conduction of a first switching transistor that is included in each of the pixels and includes a gate connected to the control line disposed in each of the rows, one of a source and a drain connected to the source of the drive transistor and the capacitor element, and the other of the source and the drain connected to the fixed potential line, in simultaneously causing the non-conduction in the k-th drive block, the non-conduction is caused between the first signal line and the gate of the drive transistor, by causing non-conduction of the second switching transistor, in simultaneously causing the non-conduction in the (k+1)-th drive block, the non-conduction is caused between the second signal line and the gate of the drive transistor, by causing non-conduction of the third switching transistor, and in the storing of the summed voltage in the k-th drive block, the luminance signal voltage is applied from the first signal line to the gate of the drive transistor, by causing non-conduction of the second switching transistor.

7. A display device including pixels arranged in rows and columns, the display device comprising:

a first signal line and a second signal line that are disposed in each of the columns, for supplying the pixels in the corresponding column with a signal voltage that determines luminance of the pixels;

a first power source line and a second power source line;

a scanning line disposed in each of the rows; and a control line disposed in each of the rows, wherein the pixels compose at least two drive blocks, each of the drive blocks including plural pixel rows, each of the pixels includes:

a luminescence element that includes terminals, one of the terminals being connected to the second power source line, and the luminescence element generating photons according to a flow of a signal current corresponding to the signal voltage;

a drive transistor that includes a gate, a source, and a drain, one of the source and the drain being connected to the first power source line, the other of the source and the drain being connected to the other of the terminals of the luminescence element, and the drive transistor converting the signal voltage applied between the gate and the source of the drive transistor into the signal current;

a capacitor element that includes terminals, one of the terminals being connected to the gate of the drive transistor, and the other of the terminals being connected to the source of the drive transistor; and a first switching transistor that includes a gate connected to the control line, one of a source and a drain connected to the other of the terminals of the capacitor element, and the other of the source and the drain connected to a fixed potential line, each of the pixels in a k-th drive block of the drive blocks further includes a second switching transistor that includes a gate connected to the scanning line, one of a source and a drain connected to the gate of the drive transistor, and the other of the source and the drain connected to the first signal line, k being a positive integer, each of the pixels in a (k+1)-th drive block of the drive blocks further includes a third switching transistor that includes a gate connected to the scanning line, one of a source and a drain connected to the gate of the drive transistor, and the other of the source and the drain connected to the second signal line, each of the control lines is connected to all of the pixels in a same one of the drive blocks and not connected to the pixels in different ones of the drive blocks, a threshold voltage detection period is provided in common for the pixels in a same one of the driving blocks, and the threshold voltage detection period provided in common to the pixels in the same one of the driving blocks is provided independently for the pixels in different ones of the driving blocks, the threshold voltage detection period being a period during which a threshold voltage of the drive transistor is detected when a fixed voltage of the fixed potential line is applied to the source of the drive transistor by controlling the control line, the signal voltage includes a luminance signal voltage for causing the luminescence element to generate photons and a reference voltage for causing a voltage corresponding to a threshold voltage of the drive transistor to be stored in the capacitor element, the display device further comprises:

a signal line drive circuit that outputs the signal voltage to the first signal line and the second signal line; and a timing control circuit that controls the timing at which the signal line drive circuit outputs the signal voltage, the timing control circuit (i) causes the signal line drive circuit to output the reference voltage to the second signal line when the signal line drive circuit is outputting the luminance signal voltage to the first signal line, and (ii) causes the signal line drive circuit to output the reference voltage to the first signal line when the signal line drive circuit is outputting the luminance signal voltage to the second signal line, and a threshold voltage correction period, in which the reference voltage is applied to the (k+1)-th drive block for threshold voltage correction, is provided in a signal voltage storing period in which the signal voltage is sampled in the k-th drive block.

* * * * *